US012750475B2

(12) United States Patent
Zhang et al.

(10) Patent No.: US 12,750,475 B2
(45) **Date of Patent: *Sep. 29, 2026**

(54) INTER PREDICTION METHOD AND APPARATUS

(71) Applicant: HUAWEI TECHNOLOGIES CO., LTD., Shenzhen (CN)

(72) Inventors: Na Zhang, Shenzhen (CN); Jicheng An, Shenzhen (CN); Quanhe Yu, Beijing (CN); Jianhua Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/929,661

(22) Filed: Oct. 29, 2024

(65) Prior Publication Data

US 2025/0055978 A1 Feb. 13, 2025

Related U.S. Application Data

(63) Continuation of application No. 17/872,240, filed on Jul. 25, 2022, now Pat. No. 12,143,569, which is a (Continued)

(30) Foreign Application Priority Data

Mar. 29, 2018 (WO) ................ PCT/CN2018/081195

(51) Int. Cl.
*H04N 19/52* (2014.01)
*H04N 19/105* (2014.01)
(Continued)

(52) U.S. Cl.
CPC ......... *H04N 19/105* (2014.11); *H04N 19/159* (2014.11); *H04N 19/176* (2014.11); *H04N 19/30* (2014.11)

(58) Field of Classification Search
CPC .. H04N 19/105; H04N 19/159; H04N 19/176; H04N 19/30
See application file for complete search history.

(56) References Cited

U.S. PATENT DOCUMENTS 9,374,578 B1 6/2016 Mukherjee et al.
9,609,343 B1 3/2017 Chen et al.
(Continued)

FOREIGN PATENT DOCUMENTS

CN 101605256 A 12/2009
CN 101820547 A 9/2010
(Continued)

OTHER PUBLICATIONS

P. Helle et al., "Block Merging for Quadtree-Based Partitioning in HEVC," in IEEE Transactions on Circuits and Systems for Video Technology, vol. 22, No. 12, pp. 1720-1731, Dec. 2012, doi: 10.1109/TCSVT.2012.2223051.
(Continued)

*Primary Examiner* — Jonathan R Messmore

(57) ABSTRACT

An inter prediction method is provided, including: obtaining a first reference frame index and a first motion vector of a to-be-processed block; deriving a second reference frame index from the first reference frame index, where the second reference frame index is different from the first reference frame index; scaling the first motion vector to obtain a second motion vector; obtaining a first reference block of the to-be-processed block according to the first reference frame index and the first motion vector; obtaining a second reference block of the to-be-processed block according to the second reference frame index and the second motion vector; and weighting the first reference block and the second reference block to obtain a combined prediction block. Each reference list for inter prediction is allowed to include two
(Continued)

groups of motion information, which helps improve an inter prediction effect.

18 Claims, 9 Drawing Sheets

Related U.S. Application Data continuation of application No. 17/011,163, filed on Sep. 3, 2020, now Pat. No. 11,412,210, which is a continuation of application No. PCT/CN2018/081541, filed on Apr. 2, 2018.

(51) Int. Cl.

| | |
|---|---|
| ***H04N 19/159*** | (2014.01) |
| ***H04N 19/176*** | (2014.01) |
| ***H04N 19/30*** | (2014.01) |

(56) References Cited

U.S. PATENT DOCUMENTS

| | | | | |
|---|---|---|---|---|
| 10,021,414 | B2 * | 7/2018 | Seregin | H04N 19/52 |
| 2013/0054645 | A1 * | 2/2013 | Bhagavathy | G06V 20/46 707/E17.014 |
| 2014/0219357 | A1 * | 8/2014 | Chuang | H04N 19/593 375/240.16 |
| 2014/0241432 | A1 * | 8/2014 | Suzuki | H04N 19/513 375/240.16 |
| 2015/0163493 | A1 * | 6/2015 | Huang | H04N 19/176 375/240.03 |
| 2018/0376149 | A1 | 12/2018 | Zhang et al. | |
| 2019/0110064 | A1 | 4/2019 | Zhang et al. | |
| 2019/0313115 | A1 | 10/2019 | Chao et al. | |

FOREIGN PATENT DOCUMENTS

| | | | |
|---|---|---|---|
| CN | 101931803 | A | 12/2010 |
| CN | 102387360 | A | 3/2012 |
| CN | 102752588 | A | 10/2012 |
| CN | 102883161 | A | 1/2013 |
| CN | 103190151 | A | 7/2013 |
| CN | 103444174 | A | 12/2013 |
| CN | 107205149 | A | 9/2017 |
| CN | 107205156 | A | 9/2017 |
| WO | 2014083492 | A2 | 6/2014 |

OTHER PUBLICATIONS

ITU-T H.265 (Feb. 2018). Series H: Audiovisual and Multimedia Systems Infrastructure of audiovisual services—Coding of moving video. High efficiency video coding. total 692 pages.

* cited by examiner

INTER PREDICTION METHOD AND APPARATUS

CROSS-REFERENCE TO RELATED APPLICATIONS

This application is a continuation of U.S. patent application Ser. No. 17/872,240, filed on Jul. 25, 2022, which is a continuation of U.S. patent application Ser. No. 17/011,163, filed on Sep. 3, 2020, now U.S. Pat. No. 11,412,210, which is a continuation of International Application No. PCT/CN2018/081541, filed on Apr. 2, 2018, which claims the priority to International Application No. PCT/CN2018/081195, filed on Mar. 29, 2018. The disclosures of the aforementioned patent applications are hereby incorporated by reference in their entireties.

TECHNICAL FIELD

This application relates to the field of video coding technologies, and more specifically, to an inter prediction method and apparatus.

BACKGROUND

A basic principle of video coding compression is to eliminate redundancy as much as possible according to a correlation between a space domain, a time domain, and a code word. Currently, a prevalent method is to use a block-based hybrid video coding framework to implement video coding compression by performing steps such as prediction (including intra prediction and inter prediction), transformation, quantization, and entropy encoding. For inter prediction, motion information of each picture block needs to be determined, so as to generate a prediction block of the picture block in a motion compensation process.

There are two types of inter prediction frames: a P-frame and a B-frame. The P-frame includes a reference list including only one group of motion information (one motion vector and one reference frame). The B-frame includes two reference lists that allow two groups of motion information (two motion vectors and two reference frames (one reference frame is allowed in configuration of the low-delay B)). In other words, each reference list includes one group of motion information.

SUMMARY

This application provides an inter prediction method and apparatus, to allow two groups of motion information to be used in each reference list for inter prediction, thereby helping improve effectiveness of a prediction effect.

According to a first aspect, an inter prediction method is provided, including: obtaining a first reference frame index and a first motion vector of a to-be-processed block; deriving a second reference frame index from the first reference frame index, where the second reference frame index is different from the first reference frame index; scaling the first motion vector to obtain a second motion vector; obtaining a first reference block of the to-be-processed block according to the first reference frame index and the first motion vector; obtaining a second reference block of the to-be-processed block according to the second reference frame index and the second motion vector; and weighting the first reference block and the second reference block to obtain a combined prediction block.

In this embodiment of this application, a video coding apparatus obtains the first reference frame index and the first motion vector of the to-be-processed block, derives the second reference frame index from the first reference frame index, scales the first motion vector to obtain the second motion vector, obtains the first reference block of the to-be-processed block according to the first reference frame index and the first motion vector, obtains the second reference block of the to-be-processed block according to the second reference frame index and the second motion vector, and finally weights the first reference block and the second reference block to obtain the combined prediction block. In this case, the combined prediction block is provided for inter prediction. In this way, if the to-be-processed block selects the combined prediction block as a prediction block, a prediction effect is comparatively effective, and this helps improve a picture prediction effect.

In a possible implementation, the scaling the first motion vector to obtain a second motion vector includes: multiplying a ratio of a second distance to a first distance by the first motion vector, to obtain the second motion vector, where the first distance is a temporal distance between a picture frame in which the to-be-processed block is located and a picture frame indicated by the first reference frame index, and the second distance is a temporal distance between the picture frame in which the to-be-processed block is located and a picture frame indicated by the second reference frame index.

Therefore, the video coding apparatus may calculate the second motion vector according to the temporal distance from the picture frame in which the to-be-processed block is located.

In a possible implementation, the deriving a second reference frame index from the first reference frame index includes: when the first reference frame index is 0, the second reference frame index is 1; or when the first reference frame index is not 0, the second reference frame index is 0.

Therefore, the video coding apparatus may determine a value of the second reference frame index according to a value of the first reference frame index.

In a possible implementation, the deriving a second reference frame index from the first reference frame index includes: determining that the picture frame indicated by the second reference frame index is a reference frame with a smallest quantization parameter in a reference frame set of the to-be-processed block except the picture frame indicated by the first reference frame index.

Therefore, the video coding apparatus may determine, according to a quantization parameter, the picture frame indicated by the second reference frame index.

In a possible implementation, the deriving a second reference frame index from the first reference frame index includes: determining that the picture frame indicated by the second reference frame index is a reference frame with a shortest temporal distance from the picture frame in which the to-be-processed block is located in a reference frame set of the to-be-processed block except the picture frame indicated by the first reference frame index.

Therefore, the video coding apparatus may determine, according to a temporal distance from the picture frame in which the to-be-processed block is located, the picture frame indicated by the second reference frame index.

In a possible implementation, the method is used for video encoding, and the method further includes:

encoding first identification information, where the first identification information is used to determine the first motion vector and the first reference frame index.

Therefore, the video coding apparatus encodes the first identification information in a video encoding process, so that the first motion vector and the first reference frame index can be determined in a video decoding process.

In a possible implementation, the method is used for video encoding, and the method further includes: encoding second identification information, the first reference frame index, and a vector difference between the first motion vector and a predicted motion vector, where the second identification information is used to determine the predicted motion vector.

Therefore, the video coding apparatus encodes the second identification information, the first reference frame index, and the vector difference between the first motion vector and the predicted motion vector in the video encoding process, so that the first motion vector and the first reference frame index can be determined in the video decoding process.

In a possible implementation, the method is used for video encoding; and after the obtaining a combined prediction block, the method further includes: separately calculating, according to a first preset criterion, a first encoding cost value of using the combined prediction block as the prediction block of the to-be-processed block and a second encoding cost value of using the first reference block as the prediction block of the to-be-processed block, where the first preset criterion includes any one of the following criteria: a sum of absolute transformed differences SATD criterion, a rate distortion optimization RDO criterion, a sum of absolute differences SAD criterion, and a mean squared error MSE criterion; and when the first encoding cost value is less than the second encoding cost value, using the combined prediction block as the prediction block of the to-be-processed block; or when the first encoding cost value is greater than or equal to the second encoding cost value, using the first reference block as the prediction block of the to-be-processed block.

Therefore, after obtaining the combined prediction block, the video coding apparatus may determine, according to the first preset criterion, whether the prediction block of the to-be-processed block is the first reference block or the combined prediction block.

In a possible implementation, the method is used for video encoding, and the method further includes: encoding third identification information. The third identification information is a first value when the combined prediction block is used as the prediction block of the to-be-processed block, or the third identification information is a second value when the first reference block is used as the prediction block of the to-be-processed block. The first value is different from the second value.

Therefore, in the video encoding process, the video coding apparatus encodes the third identification information into the values, to determine whether to use the combined prediction block or the first reference block as the prediction block of the to-be-processed block.

In a possible implementation, before the scaling the first motion vector to obtain a second motion vector, the method further includes: determining that the to-be-processed block meets a second preset criterion, where the second preset criterion includes any one or a combination of several of the following criteria: a size of the to-be-processed block or a temporal or spatial neighboring block of the to-be-processed block meets a preset threshold, a block partition mode of the to-be-processed block or the temporal or spatial neighboring block of the to-be-processed block meets a preset block partition mode, or a prediction mode of the to-be-processed block or the temporal or spatial neighboring block of the to-be-processed block meets a preset prediction mode; and correspondingly, after the obtaining a combined prediction block, the method further includes: using the combined prediction block as the prediction block of the to-be-processed block.

Therefore, in the video encoding process or the video decoding process, the video coding apparatus determines, according to an agreed criterion, whether to use the combined prediction block or the first reference block as the prediction block of the to-be-processed block, with no need to introduce identification information.

In a possible implementation, the method is used for video decoding, and the obtaining a first reference frame index and a first motion vector of a to-be-processed block includes: parsing a bitstream to obtain fourth identification information; obtaining a predicted motion vector of the to-be-processed block from a candidate predicted motion vector set of the to-be-processed block according to the fourth identification information, where each predicted motion vector in the candidate predicted motion vector set corresponds to one reference frame index; wherein the predicted motion vector is the first motion vector; and wherein a reference frame index corresponding to the predicted motion vector is the first reference frame index.

Therefore, in a video decoding process, the video coding apparatus parses the bitstream to obtain the fourth identification information by, and searches for the predicted motion vector of the to-be-processed block to determine the first motion vector and the first reference frame index.

In a possible implementation, the method is used for video decoding, and the obtaining a first reference frame index and a first motion vector of a to-be-processed block includes: parsing a bitstream to obtain fifth identification information, the first reference frame index, and a vector difference; obtaining a predicted motion vector of the to-be-processed block from a candidate predicted motion vector set of the to-be-processed block according to the fifth identification information; and adding the predicted motion vector and the vector difference to obtain the first motion vector.

Therefore, the video coding apparatus parses the bitstream to obtain the fifth identification information, the first reference frame index, and the vector difference, and further calculates the first motion vector, so that the first reference frame index and the first motion vector can be determined.

In a possible implementation, the method is used for video decoding. The combined prediction block is used as the prediction block of the to-be-processed block when sixth identification information is a third value, or the first reference block is used as the prediction block of the to-be-processed block when the sixth identification information is a fourth value. The third value is different from the fourth value. Before the scaling the first motion vector to obtain a second motion vector, the method further includes: parsing the bitstream to obtain the sixth identification information. The sixth identification information is the third value.

Therefore, in this embodiment of this application, the video coding apparatus may parse the bitstream, to determine, according to a value of the sixth identification information obtained through parsing, whether to select the first reference block or the combined prediction block as the prediction block of the to-be-processed block.

According to a second aspect, an inter prediction apparatus is provided, where the apparatus includes modules configured to perform the method in any one of the first aspect or the implementations of the first aspect.

According to a third aspect, a terminal device is provided. The terminal device includes: a memory, configured to store a program; and a processor, configured to execute the program stored in the memory. When the program is executed, the processor is configured to perform the method in any one of the first aspect or the implementations of the first aspect.

According to a fourth aspect, a video codec is provided, including a non-volatile storage medium and a central processing unit, where the non-volatile storage medium stores an executable program, and the central processing unit is connected to the non-volatile storage medium and executes the executable program to implement the method in any one of the first aspect or the implementations of the first aspect.

According to a fifth aspect, a video coding system is provided, including a non-volatile storage medium and a central processing unit, where the non-volatile storage medium stores an executable program, and the central processing unit is connected to the non-volatile storage medium and executes the executable program to implement the method in any one of the first aspect or the implementations of the first aspect.

According to a sixth aspect, a computer-readable medium is provided, where the computer-readable medium stores program code to be executed by a device, and the program code includes an instruction used to perform the method in any one of the first aspect or the implementations of the first aspect.

DESCRIPTION OF EMBODIMENTS

Figure 1:
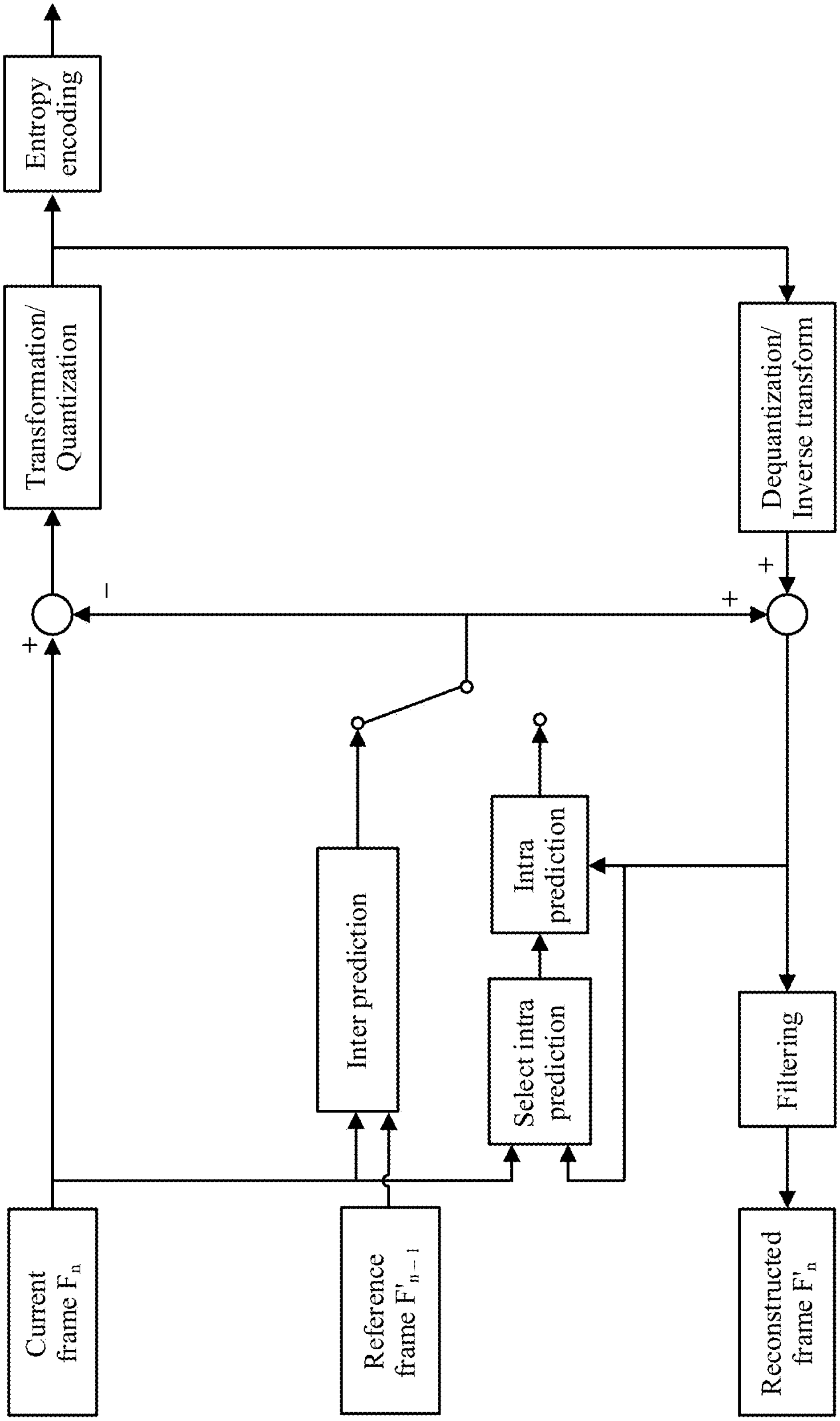
FIG. 1 is a schematic diagram of a video encoding process.

The following describes technical solutions of this application with reference to accompanying drawings.

An inter prediction method in the embodiments of this application may be applied to the field of video coding technologies. To better understand the inter prediction method in the embodiments of this application, the following describes concepts or terms used in video coding.

A video usually includes numerous frames of pictures in a specific sequence. Usually, massive repeated information (redundant information) exists in one frame of picture or different frames of pictures. For example, one frame of picture usually includes massive parts having a same spatial structure or similar spatial structures. That is, a video file includes massive spatially redundant information. In addition, the video file includes massive temporally redundant information. This is caused by a composition structure of a video. For example, a frame rate of video sampling usually ranges from 25 frames/second to 60 frames/second. That is, a sampling time interval between two adjacent frames ranges from 1/60 second to 1/25 second. In such a short time, massive similar information exists in almost all pictures obtained through sampling, and a high association exists between the pictures.

Currently, in an international universal range, there are four types of mainstream compression coding schemes in existing video compression coding standards: chrominance sampling, predictive coding, transform coding, and quantization coding. The coding schemes are separately described in detail below.

Chrominance sampling: This manner fully uses visual and psychological features of human eyes, and attempts to maximally reduce a data volume described by a single element starting from underlying data representation. For example, luminance-chrominance-chrominance (YUV) color coding is used in most television systems, and is a standard widely used in television systems in Europe. A YUV color space includes one luminance signal Y and two color difference signals U and V. The three components are independent of each other. Compared with a conventional red-green-blue (RGB) color mode, a YUV color mode has more advantages: Separate representation is more flexible, and a smaller bandwidth is occupied for transmission. For example, a form of YUV 4:2:0 indicates that the two chrominance components U and V are only a half of the luminance component Y in both a horizontal direction and a vertical direction. In other words, four samples include four luminance components Y, only one chrominance component U, and only one chrominance component V. When representation is performed in such a form, the data volume is further reduced and only accounts for approximately 33% of an original data volume. Therefore, chrominance sampling fully uses physiological and visual features of human eyes, and implementing video compression in this chrominance sampling manner is one of video data compression manners widely used at present.

Predictive coding: During predictive coding, a currently to-be-encoded frame is predicted according to data information of a previously encoded frame. A predictor is obtained through prediction and is not exactly equal to an actual value. There is a specific residual value between the predictor and the actual value. More accurate prediction indicates a predictor closer to the actual value and a smaller residual value. In this way, a data volume can be greatly reduced by encoding the residual value. A matching picture is restored or reconstructed by adding the residual value to the predictor during decoding on a decoder side. This is a basic thinking method of predictive coding. In mainstream coding standards, predictive coding is classified into two basic types: intra prediction and inter prediction. Intra prediction means that a sample value of a sample in a current coding unit is predicated by using a sample value of a pixel in a reconstructed area in a current picture. Inter prediction means that a reconstructed picture is searched for a matching reference block for a current coding unit in a current picture, a sample value of a sample in the reference block is used as prediction information or a predictor of a sample value of a sample in the current coding unit, and motion information of the current coding unit is transmitted.

Transform coding: In this encoding manner, original spatial-domain information is not directly encoded. Instead, a sampled value of the information is converted from a current domain to another domain defined by a person (which is usually referred to as a transform domain) according to a transform function in a specific form, and then, compression coding is performed according to a distribution feature of the information in the transform domain. A data correlation of video picture data is usually high in a spatial domain, and the video picture data includes massive redundant information. Therefore, if encoding is directly performed, a quite large quantity of bits are needed. However, after the sampled value of the information is converted into the transform domain, the data correlation is greatly reduced. In this case, during encoding, because redundant information is reduced, a data volume required for the encoding is greatly reduced accordingly. In this way, a comparatively high compression ratio can be obtained, and a comparatively favorable compression effect can be achieved. Typical transform coding schemes include Karhunen-Loeve (K-L) transform, Fourier transform, and the like.

Quantization coding: Data is not compressed in transform coding mentioned above, but data can be effectively compressed only in a quantization process. The quantization process is a main cause for a "loss" of data in lossy compression. The quantization process is a process in which an input value with a comparatively large dynamic range is "forcibly planned" into a smaller output value. The quantization input value has a comparatively large range, and therefore needs to be represented by using a comparatively large quantity of bits. However, the output value obtained after "forcibly planning" has a comparatively small range, and therefore only needs to be represented by using a small quantity of bits.

In an encoding algorithm according to a hybrid coding architecture, the foregoing compression coding schemes can be used in a combination manner. An encoder control module selects, according to local features of different picture blocks in a video frame, coding schemes used for the picture blocks. Frequency domain prediction or spatial domain prediction is performed on a block on which intra predictive coding is performed, and motion compensation prediction is performed on a block on which inter predictive coding is performed. Then, transform and quantization processing are performed on a predicted residual to generate a residual coefficient. Finally, a final bitstream is generated by an entropy encoder. To avoid accumulation of prediction errors, an intra or inter prediction reference signal is obtained by a decoding module on an encoder side. The residual coefficient obtained after transform and quantization is dequantized and inversely transformed to reconstruct a residual signal, and then a reconstructed residual signal is added to a predicted reference signal to obtain a reconstructed picture. In addition, sample refinement is performed on the reconstructed picture in loop filtering, to improve encoding quality of the reconstructed picture.

For ease of understanding, the following describes some concepts or terms used in the embodiments of this application.

A basic principle of video coding compression is to eliminate redundancy as much as possible according to a correlation between a space domain, a time domain, and a code word. Currently, a prevalent method is to use a block-based hybrid video coding framework to implement video coding compression by performing steps such as prediction (including intra prediction and inter prediction), transformation, quantization, and entropy encoding. This coding framework shows strong vitality. From the motion picture expert group (MPEG)-½ to the latest video coding standard H.265/high-efficiency video coding (HEVC), this block-based hybrid video coding framework is still used.

For inter prediction, motion information of each picture block needs to be determined, so as to generate a prediction block of the picture block in a motion compensation process. The motion information includes reference picture information and a motion vector. The reference picture information includes uni-directionally/bi-directionally prediction information, a reference picture list, and a reference picture index corresponding to the reference picture list. A motion vector (MV) is a position offset in a horizontal or vertical direction.

An inter prediction technology in HEVC still uses a conventional motion compensated prediction (MCP) method. However, in terms of motion information prediction, different from prior standards, the HEVC uses a multi-motion-information-based contention method, thereby improving motion information prediction accuracy and improving coding compression performance. A basic principle of multi-motion-information-based contention is that a plurality of groups of motion information (including a motion vector and an index value of a reference picture to which the motion vector points) are obtained from a plurality of encoded neighboring blocks of a current block, the plurality of groups of motion information form a list in a specific order, and an index number is allocated to each group of motion information. During encoding, a group of optimal motion information is selected from the plurality of groups of motion information as a motion information predictor of the current block, and an index number of the selected motion information in the list is written into a bitstream. On a decoder side, the index number may be obtained through decoding, and a motion information list (the obtained motion information list is consistent with that on an encoder side) is constructed according to motion information of a decoded neighboring block of the current block; in this way, a group of motion information is determined from the motion information list according to the index number obtained through decoding, and is used as the motion information predictor of the current block. As a comparison, in a motion information prediction method in a previous standard, prediction is performed using only one group of motion information, and multi-motion-information-based contention is not used.

HEVC has several inter prediction modes: a merge mode, a skip mode, and an AMVP mode. A multi-motion-information-based contention method is used in all of the modes. Neighboring blocks of the current block include a spatial neighboring block and a temporal neighboring block (co-location), and corresponding motion information is also referred to as spatial/temporal motion information. In the merge/skip mode, a maximum of four pieces of spatial candidate motion information and one piece of temporal candidate motion information are allowed. The merge and skip modes share a same motion information list. In the AMVP mode, a maximum of two pieces of spatial candidate motion information and one piece of temporal candidate motion information are allowed. The spatial motion information and the temporal motion information form a motion information list. An encoder selects a group of optimal motion information from the motion information list as a motion information predictor of the current block.

A piece of candidate motion information in the motion information list may be a group of block-level motion information, or may be a plurality of groups of sub-block-level motion information (for example, ATMVP and ATMVP-EXT in the JVET, and IVMP and BVSP in the 3D-HEVC).

The AMVP mode means that an MVD (an MV difference, that is, a difference between an MV obtained by performing motion estimation (ME) on a current block and a motion vector predictor selected in the list) and a residual (where the residual is a difference between an actual sample value and a sample predictor of the current block) need to be transmitted during encoding. That is, bitstream information of a block encoded in the AMVP mode definitely includes the MVD information and the residual information.

In the merge mode, during encoding, an MVD does not need to be transmitted, but a residual needs to be transmitted. That is, bitstream information of a block encoded in the merge mode does not include MVD information, but includes residual information.

In the skip mode, neither an MVD nor a residual needs to be transmitted during encoding. That is, bitstream information of a block encoded in the skip mode includes neither MVD information nor residual information.

The merge mode and skip mode share a same motion information list. Therefore, the merge mode is not distinguished from the skip mode in the following.

There are two types of frames for inter prediction: a P-frame and a B-frame. The P-frame includes a reference list including only one group of motion information (one motion vector and one reference frame). The B-frame includes two reference lists that allow two groups of motion information (two motion vectors and two reference frames (one reference frame is allowed in configuration of the low-delay B)). In the embodiments of this application, two groups of motion information are used in each reference list to perform inter prediction. It should be understood that the two groups of motion information in the embodiments of this application may alternatively be extended to a plurality of groups of motion information. This is not limited.

The method in the embodiments of this application may be performed in a video encoding or decoding process. Video encoding and decoding processes are briefly described below with reference to FIG. 1 and FIG. 2.

FIG. 1 is a schematic diagram of a video encoding process.

As shown in FIG. 1, when a current picture block in a current frame Fn is predicted, either intra prediction or inter prediction may be performed. Specifically, intra coding or inter coding may be selected according to a type of the current frame Fn. For example, if the current frame Fn is an I-frame, intra prediction is performed; if the current frame Fn is a P-frame or a B-frame, inter prediction is performed. When intra prediction is performed, a sample value of a sample in the current picture block can be predicted by using a sample value of a sample in a reconstructed area in the current frame Fn. When inter prediction is used, a sample value of a sample in the current picture block can be predicted by using a sample value of a sample in a reference block, in a reference frame $F'_{n-1}$, that matches the current picture block.

After a prediction block of the current picture block is obtained according to inter prediction or intra prediction, a difference between the sample value of the sample in the current picture block and a sample value of a sample in the prediction block is calculated to obtain residual information; and transformation, quantization, and entropy encoding are performed on the residual information to obtain an encoded bitstream. In addition, in the encoding process, the residual information of the current frame Fn and prediction information of the current frame Fn need to be added and a filtering operation is performed to obtain a reconstructed frame $F'_n$ of the current frame, and the reconstructed frame $F'_n$ of the current frame is used as a reference frame for subsequent encoding.

Figure 2:
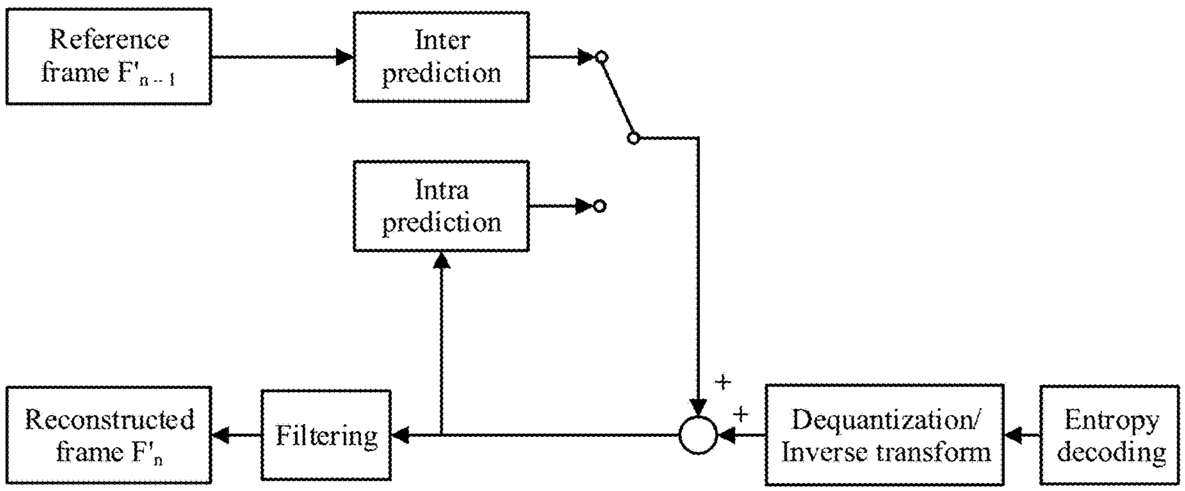
FIG. 2 is a schematic diagram of a video decoding process.

FIG. 2 is a schematic diagram of a video decoding process.

The video decoding process shown in FIG. 2 is equivalent to an inverse process of the video encoding process shown in FIG. 1. During decoding, entropy decoding, dequantization, and inverse transform are performed to obtain residual information, and whether intra prediction or inter prediction is performed on the current picture block is determined according to a decoded bitstream. In the case of intra prediction, prediction information is constructed according to an intra prediction method by using a sample value of a sample in a reconstructed area in a current frame. In the case of inter prediction, motion information needs to be parsed out, a reference block in a reconstructed picture is determined by using the motion information that is parsed out, a sample value of a sample in a reference block is used as prediction information, the prediction information and residual information are added, and a filtering operation is performed, to obtain reconstructed information.

To better understand the inter prediction method in this embodiment of this application, the following first briefly describes a basic concept of inter prediction/inter coding.

Inter prediction/inter coding (motion prediction/compensation) is an important video compression technology, and is performed to remove a temporal redundancy in video information. Because a video sequence usually includes a quite strong time domain correlation, not all information of each picture is required, and only motion information and motion compensation information of a current picture (Current Frame) need to be transmitted to a decoder side. Inter prediction is to use an encoded picture as a reference picture (Reference Frame) of a current frame, search for a matching reference block for a current encoding block in the current picture, and use a sample value of a sample in the reference block as prediction information or a predictor of a sample value of a sample in the current encoding block to obtain motion information of each block. The motion information usually includes indication information of a picture in which a reference block is located, that is, reference frame information, and information about a displacement from the reference block to a current sample block, that is, a motion vector (MV).

In addition, in a video coding process, a comparatively large proportion of a compressed bitstream is used to transmit motion information. In a case of a low bit rate, especially for a high-definition video, bits used to indicate motion information usually exceed 50% of an entire bitstream. Efficient encoding of the motion information is an important means to improve encoding efficiency. In a video, blocks in neighboring positions may belong to a same object or a same motion scenario, and have similar motions. Therefore, a correlation between motion vectors of spatial and temporal neighboring blocks can be used to reduce bits consumed by motion information.

In encoding/decoding standards, motion information of neighboring positions is usually used to predict motion information of a current position. An MV in the motion information is differentially encoded, and is divided into two parts: an MV predictor and a motion vector difference (MVD). The MV predictor is not encoded or is not directly encoded, and is derived from temporal and spatial motion vectors. MVD information is encoded into a bitstream for transmission. In a decoding process, an MVD is extracted from a bitstream, an MV predictor is derived, and the MV predictor and the MVD are added to obtain a final MV. The closer the MV predictor obtained through derivation is to the final MV, the smaller the MVD is to be transmitted. Therefore, optimization of an MV predictor derivation method can effectively reduce bits consumed by the motion information, and this is crucial to efficient coding.

Figure 3:
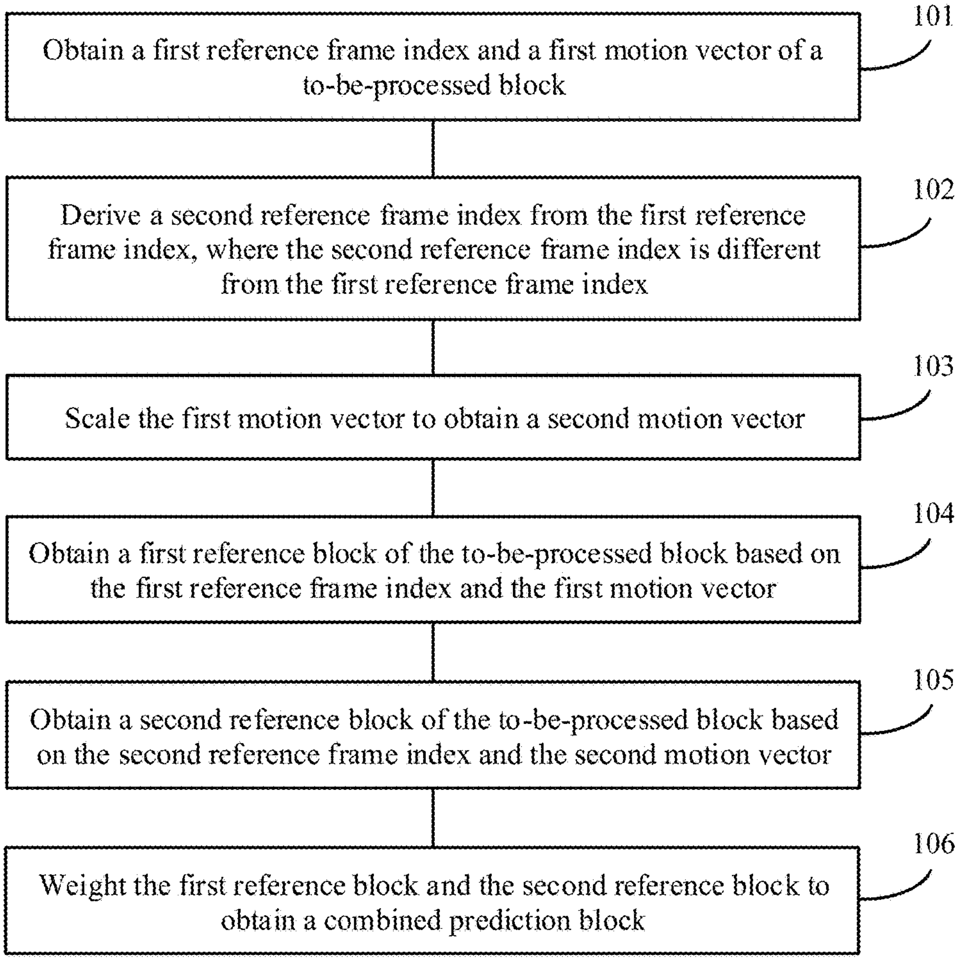
FIG. 3 is a schematic flowchart of an inter prediction method according to an embodiment of this application.

FIG. 3 is a schematic flowchart of a picture prediction method according to an embodiment of this application. The method shown in FIG. 3 may be performed by a video coding apparatus, a video codec, a video coding system, or another device having video encoding and decoding functions. The method shown in FIG. 3 may be performed in an encoding process or a decoding process. More specifically, the method shown in FIG. 3 may be performed in an inter prediction process occurring during encoding/decoding.

The method shown in FIG. 3 includes step 101 to step 106. The following describes step 101 to step 106 in detail.

101. Obtain a first reference frame index and a first motion vector of a to-be-processed block.

The to-be-processed block may be a picture block in a to-be-processed picture or a sub-picture in a to-be-processed picture. In addition, the to-be-processed block may be a picture block to be encoded in an encoding process or a picture block to be decoded in a decoding process.

The first reference frame index and the first motion vector are included in a same group of motion information. The motion information may be optimal motion information selected from a target reference list of the to-be-processed block.

To improve a prediction effect of inter prediction, in this embodiment of this application, a plurality of groups of motion information are provided for each reference list for inter prediction. Specifically, a second reference frame index and a second motion vector are introduced, and the second reference frame index and the second motion vector are included in a same group of motion information. The second reference frame index is determined according to the first reference frame index, and the second motion vector is obtained through scaling according to the first motion vector.

102. Derive the second reference frame index from the first reference frame index, where the second reference frame index is different from the first reference frame index.

It should be understood that there are a plurality of manners, but not limited to the following three manners, for obtaining the second reference frame index. The following provides description by using examples of the following three manners.

Manner 1: step 102 includes: when the first reference frame index is 0, the second reference frame index is 1; or when the first reference frame index is not 0, the second reference frame index is 0.

For example, a relationship between the first reference frame index and the second reference frame index may be shown in the following formula (1.1):

$$RefX' = (RefX == 0)?1:0; \quad (1.1)$$

X represents 0 or 1, and represents a reference list 0 or a reference list 1. RefX represents the first reference frame index. RefX' represents the second reference frame index. According to the foregoing formula (1.1), if RefX is 0, RefX' is 1; if RefX is not 0, RefX' is 0.

It should be understood that the foregoing formula (1.1) is merely a possible implementation of this embodiment of this application, and constitutes no limitation to this embodiment of this application.

Manner 2: In an embodiment, step 102 includes: determining that a picture frame indicated by the second reference frame index is a reference frame with a smallest quantization parameter in a reference frame set of the to-be-processed block except a picture frame indicated by the first reference frame index.

Specifically, the video coding apparatus may select, according to a quantization parameter, the picture frame indicated by the second reference frame index. For example, a picture frame with a smallest QP parameter may be selected, as a newly added reference frame (that is, the picture frame indicated by the second reference frame index), from the reference frame set of the to-be-processed block except the picture frame indicated by the first reference frame index.

Manner 3: In an embodiment, step 102 includes: determining that a picture frame indicated by the second reference frame index is a reference frame, with a shortest temporal distance from the picture frame in which the to-be-processed block is located, in a reference frame set of the to-be-processed block except a picture frame indicated by the first reference frame index.

Specifically, the video coding apparatus may select, according to a temporal distance between a picture frame and the picture frame in which the to-be-processed block is located, the picture frame indicated by the second reference frame index. For example, a picture frame with a shortest temporal distance from a current picture frame may be selected, as a newly added reference frame (that is, the picture frame indicated by the second reference frame index), from the reference frame set of the to-be-processed block except the picture frame indicated by the first reference frame index.

103. Scale the first motion vector to obtain the second motion vector.

Specifically, the second motion vector is obtained by scaling the first motion vector according to a temporal distance.

Optionally, step 103 includes: multiplying a ratio of a second distance to a first distance by the first motion vector, to obtain the second motion vector, where the first distance is a temporal distance between the picture frame in which the to-be-processed block is located and the picture frame indicated by the first reference frame index, and the second distance is a temporal distance between the picture frame in which the to-be-processed block is located and the picture frame indicated by the second reference frame index.

That is, the video coding apparatus multiplies the first motion vector by the ratio of the second distance to the first distance, to obtain the second motion vector. For example, the second motion vector may be obtained according to the following formula (1.2):

$$MVX' = dX' \times MVX/dX. \quad (1.2)$$

MVX' represents the second motion vector, MVX represents the first motion vector, dX represents the temporal distance between the picture frame in which the to-be-processed block is located and the picture frame indicated by the first reference frame index, and dX' represents the temporal distance between the picture frame in which the to-be-processed block is located and the picture frame indicated by the second reference frame index.

It should be understood that the foregoing formula (1.2) is merely a possible implementation of this embodiment of this application, and constitutes no limitation to this embodiment of this application.

Figure 4:
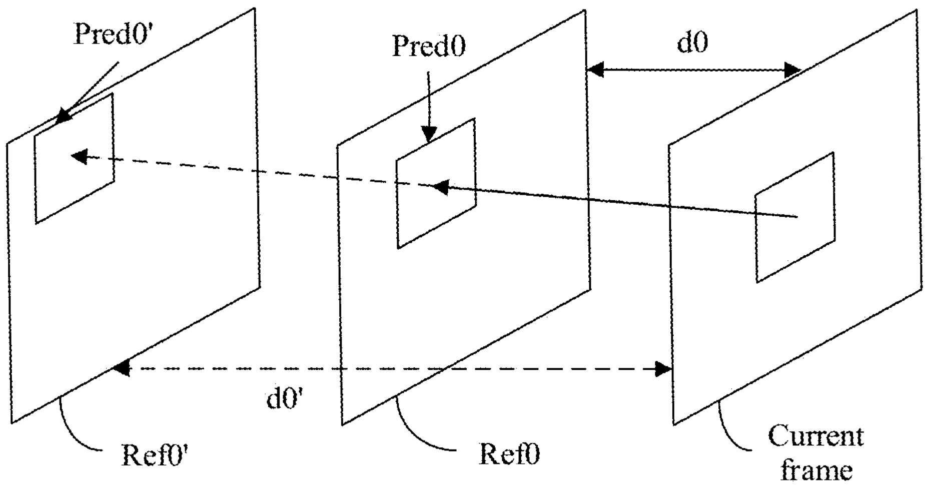
FIG. 4 is a schematic diagram of an example of a P-frame to which an embodiment of this application is applied.
Figure 5:
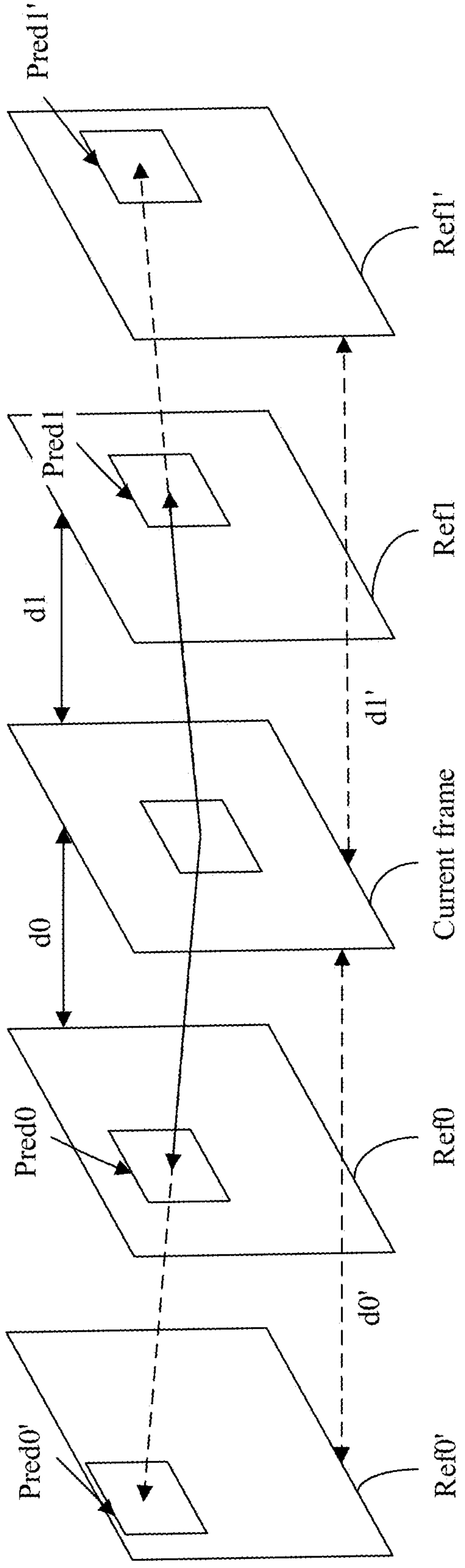
FIG. 5 is a schematic diagram of an example of a B-frame to which an embodiment of this application is applied.

It should be further understood that the method for determining the second reference frame index and the second motion vector does not limit a frame type, and is applicable to a P-frame and a B-frame. In other words, the method in this embodiment of this application may be applied to the P-frame or the B-frame. The following describes this embodiment of this application with reference to FIG. 4 and FIG. 5. FIG. 4 is a schematic diagram of an example of the P-frame to which this embodiment of this application is applied. As shown in FIG. 4, Ref0 represents an original reference frame index (a predictor of a corresponding reference block is Pred0), and Ref0' represents a newly added reference frame index (a predictor of a corresponding reference block is Pred0'). A distance between a current frame and the original reference frame is d0, and a distance between the current frame and the newly added reference frame is d0'. In addition, FIG. 5 is a schematic diagram of an example of the B-frame to which this embodiment of this application is applied. As shown in FIG. 5, Ref0 represents an original forward reference frame index (a predictor of a corresponding reference block is Pred0), Ref0' represents a newly added forward reference frame index (a predictor of a corresponding reference block is Pred0'), represents an original backward reference frame index (a predictor of a corresponding reference block is Pred1), and Ref1' represents a newly added backward reference frame index (a predictor of a corresponding reference block is Pred1'). A distance between a current frame and the original forward reference frame is d0, and a distance between the current frame and the newly added forward reference frame is d0'. A distance between the current frame and the original backward reference frame is d1, and a distance between the current frame and the newly added backward reference frame is d1'.

104. Obtain a first reference block of the to-be-processed block according to the first reference frame index and the first motion vector.

Specifically, the first reference block may be obtained according to the first motion vector and the reference picture frame indicated by the first reference frame index. The first reference block is a picture block in the reference picture frame indicated by the first reference frame index.

105. Obtain a second reference block of the to-be-processed block according to the second reference frame index and the second motion vector.

Specifically, the second reference block may be obtained according to the second motion vector and the reference picture frame indicated by the second reference frame index. The second reference block is a picture block in the reference picture frame indicated by the second reference frame index.

106. Weight the first reference block and the second reference block to obtain a combined prediction block.

Specifically, after obtaining the first reference block and the second reference block, the video coding apparatus weights the first reference block and the second reference block to obtain the combined prediction block. In a process of calculating a predictor of the combined prediction block, weighted summation is performed on a predictor of the first reference block and a predictor of the second reference block, to obtain the predictor of the combined prediction block.

It should be understood that sequence numbers of the foregoing processes do not mean execution sequences in the embodiments of this application. The execution sequences of the processes shall be determined according to functions and internal logic of the processes, and shall not be construed as any limitation to the implementation processes of the embodiments of this application.

For example, for one-way prediction, the predictor of the combined prediction block is shown in the following formula (1.3):

$$Pred = w1 * PredX + w2 * PredX' \tag{1.3}$$

PredX represents a predictor of the current block in the first reference block of the original reference frame; PredX' represents a predictor of the current block in the second reference block of the newly added reference frame; and w1 and w2 represent weighting factors and are values greater than 0 and less than 1, and w1+w2=1. For example, w1=w2=0.5.

It should be understood that the values of w1 and w2 in this embodiment of this application may be determined as required, and are not specifically limited in this embodiment of this application.

It should be further understood that the foregoing formula (1.3) is merely a possible implementation of this embodiment of this application, and constitutes no limitation to this embodiment of this application.

For bi-directional prediction, the predictor of the combined prediction block is shown in the following formula (1.4):

$$Pred = w1 * ((PredX + PredY) \gg 1) + w2 * ((PredX' + PredY') \gg 1. \tag{1.4}$$

PredX represents a predictor of the current block in a first forward reference block of the original forward reference frame; PredX' represents a predictor of the current block in a second forward reference block of the newly added forward reference frame; PredY represents a predictor of the current block in a first backward reference block of the original backward reference frame; PredY' represents a predictor of the current block in a second backward reference block of the newly added backward reference frame; and w1 and w2 represent weighting factors and are values greater than 0 and less than 1, and w1+w2=1. For example, w1=w2=0.5. Prediction according to a reference frame in a first reference frame list (a list 0) of the current block is referred to as forward prediction in some embodiments, and a corresponding reference block is referred to as a forward reference block. Prediction according to a reference frame in a second reference frame list (a list 1) of the current block is referred to as backward prediction in some embodiments, and a corresponding reference block is referred to as a backward reference block.

It should be understood that the values of w1 and w2 in this embodiment of this application may be determined as required, and are not specifically limited in this embodiment of this application.

It should be further understood that the foregoing formula (1.4) is merely a possible implementation of this embodiment of this application, and constitutes no limitation to this embodiment of this application.

Therefore, in this embodiment of this application, the second reference frame index and the second motion vector are introduced, to provide two groups of motion information for each reference list for inter prediction of the to-be-processed block. This solution reduces a bit rate in a case of same video quality.

Figure 6:
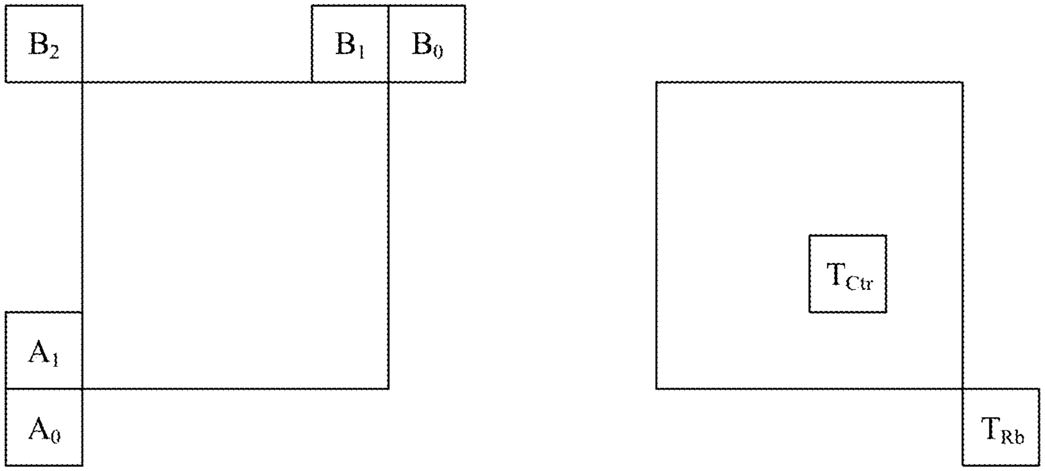
FIG. 6 is a schematic diagram of a reference block used to obtain a candidate predicted vector in inter prediction according to an embodiment of this application.

The technical solutions in this embodiment of this application may be applied to a merge mode and a non-merge mode. In the merge mode, motion information of the current block is predicted according to motion information of a spatial neighboring block and motion information of a temporal neighboring block. FIG. 6 shows positions of the used spatial neighboring block and the used temporal neighboring block. In the merge mode, the motion information of the spatial neighboring block and the motion information of the temporal neighboring block are first put in a merge candidate list, and then candidate motion information (including an inter prediction direction, a reference frame index, and a motion vector) with a minimum rate distortion cost is selected as the motion information of the current block. The candidate is identified by an index. That is, for a block encoded in the merge mode, motion information of one block can be obtained according to only one index. An existing method uses the following construction sequence of a merge candidate list:

$$A1 \rightarrow B1 \rightarrow B0 \rightarrow A0 \rightarrow ATMVP \rightarrow ATMVP\text{-}EXT \rightarrow B2 \rightarrow TMVP(TRb \rightarrow TCtr)(JEM5.0)$$

$$A1 \rightarrow B1 \rightarrow B0 \rightarrow A0 \rightarrow B2 \rightarrow TMVP(TRb \rightarrow TCtr)(HEVC)$$

ATMVP and ATMVP-EXT are two coding-subunit-level candidates added by the JVET.

To compensate for a performance loss caused by a fixed length of a merge candidate list, some additional candidates are added after an original merge candidate, including: a candidate merge motion vector via combined bi-directional prediction, a candidate merge motion vector via scaled bi-directional prediction, and a candidate motion vector via a zero vector.

In the AMVP, an MV of a current block is predicted according to temporal and spatial motion vector (MV) correlations and an MV of a neighboring block. In this case, only a motion vector prediction index and a motion vector difference (MVD) need to be transferred, and the MV does not need to be directly transferred to a decoder side, so as to reduce bandwidth required for transferring a motion parameter. In the AMVP, a motion vector prediction candidate list is first constructed according to MVs of left spatial neighboring blocks, upper spatial neighboring blocks, and temporal neighboring blocks. Two MV candidates are selected from MVs of five spatial neighboring blocks in different positions in the left figure of FIG. 6. A sequence of obtaining the left spatial neighboring blocks is A0→A1→scaled A0→scaled A1, and a sequence of obtaining the upper spatial neighboring blocks is B0→B1→B2→scaled B0→scaled B1→scaled B2. An MV candidate is selected from two temporal co-location neighboring blocks shown in the right figure of FIG. 6. If a quantity of obtained spatial and temporal candidates is greater than 2, a candidate with an index greater than 1 is removed from the candidate list. If the quantity of candidates is less than 2, a zero motion vector is added.

For a block encoded in the AMVP mode, an inter prediction direction, a reference frame index, a motion vector prediction index, and a motion vector difference need to be encoded. During uni-directional prediction, only one reference frame index, one motion vector prediction index, and one motion vector difference need to be encoded. During bi-directional prediction, two reference frame indices, two motion vector prediction indices, and two motion vector differences need to be encoded.

Optionally, in an embodiment, in a video encoding process, the video coding apparatus may encode first identification information. The first identification information is used to determine the first reference frame index and the first motion vector.

In other words, for the merge mode, in the video encoding process, the video coding apparatus may determine motion information of a corresponding block according to the first identification information. The motion information specifically includes the first reference frame index and the first motion vector. Optionally, the first identification information may be identified by an index, and is presented in a form of a flag in some embodiments. Therefore, the video coding apparatus encodes the first identification information in a video encoding process, so that the first motion vector and the first reference frame index can be determined in a video decoding process.

Optionally, in an embodiment, in a video encoding process, the video coding apparatus may encode second identification information, the first reference frame index, and a vector difference between the first motion vector and a predicted motion vector. The second identification information is used to determine the predicted motion vector.

That is, for the non-merge mode, in a video encoding process, the video coding apparatus may encode the second identification information, the first reference frame index, and the vector difference between the first motion vector and the predicted motion vector.

Optionally, in an embodiment, in a video encoding process, after the obtaining a combined prediction block, the method further includes:

separately calculating, according to a first preset criterion, a first encoding cost value of using the combined prediction block as a prediction block of the to-be-processed block and a second encoding cost value of using the first reference block as the prediction block of the to-be-processed block, where the first preset criterion includes any one of the following criteria: a sum of absolute transformed differences (SATD) criterion, a rate distortion optimization (RDO) criterion, a sum of absolute differences (SAD) criterion, and a mean squared error (MSE) criterion; and when the first encoding cost value is less than the second encoding cost value, using the combined prediction block as the prediction block of the to-be-processed block; or when the first encoding cost value is greater than or equal to the second encoding cost value, using the first reference block as the prediction block of the to-be-processed block.

Specifically, when obtaining the combined prediction block, the video coding apparatus may determine, according to the first preset criterion, whether the prediction block of the to-be-processed block is the first reference block or the combined prediction block. Further, a specific picture block used as the prediction block of the to-be-processed block may be identified by a flag. In other words, the video coding apparatus determines, according to the foregoing first preset criterion, whether each reference list uses one group of motion information or two groups of motion information.

It should be noted that, which picture block is selected as the prediction block of the to-be-processed block may be determined according to, but not limited to, a value relationship between the first encoding cost value and the second encoding cost value. No limitation is imposed thereto.

It should be understood that, the first preset criterion is not limited to the criteria described above, or may be another proper criterion. This not limited. In other words, the first encoding cost value and the second encoding cost value may be calculated according to another proper criterion. This is not limited.

Optionally, in an embodiment, in a video encoding process, the method further includes: encoding third identification information. The third identification information is a first value when the combined prediction block is used as the prediction block of the to-be-processed block, or the third identification information is a second value when the first reference block is used as the prediction block of the to-be-processed block. The first value is different from the second value.

Specifically, the video coding apparatus encodes the third identification information to determine the prediction block of the to-be-processed block. For example, if the first reference block is selected as the prediction block of the to-be-processed block, the second value is 0; if the combined prediction block is selected as the prediction block of the to-be-processed block, the first value is 1. Optionally, the third identification information may be identified by a flag, and different values of the flag are the first value and the second value. It should be understood that the first value and the second value herein constitute no limitation to this embodiment of this application. Therefore, in the video encoding process, the video coding apparatus encodes the third identification information into the values, to determine whether to use the combined prediction block or the first reference block as the prediction block of the to-be-processed block.

Optionally, in an embodiment, before the scaling the first motion vector to obtain the second motion vector, the method further includes:

- determining that the to-be-processed block meets a second preset criterion, where the second preset criterion includes any one or a combination of several of the following criteria: a size of the to-be-processed block or a temporal or spatial neighboring block of the to-be-processed block meets a preset threshold, a block partition mode of the to-be-processed block or the temporal or spatial neighboring block of the to-be-processed block meets a preset block partition mode, or a prediction mode of the to-be-processed block or the temporal or spatial neighboring block of the to-be-processed block meets a preset prediction mode; and
- correspondingly, after the obtaining a combined prediction block, the method further includes:
- using the combined prediction block as the prediction block of the to-be-processed block.

In other words, in this embodiment of this application, the flag may not need to be encoded into the different values to distinguish whether the first reference block or the combined prediction block is selected for the to-be-processed block, but a predetermined rule is used to determine whether the first reference block or the combined prediction block is selected for the to-be-processed block. For example, if the size of the to-be-processed block or the temporal or spatial neighboring block of the to-be-processed block meets the preset threshold, the combined prediction block is used as the prediction block of the to-be-processed block; if the block partition mode of the to-be-processed block or the temporal or spatial neighboring block of the to-be-processed block meets the preset block partition mode, the combined prediction block is used as the prediction block of the to-be-processed block; or if the prediction mode of the to-be-processed block or the temporal or spatial neighboring block of the to-be-processed block meets the preset prediction mode, the combined prediction block is used as the prediction block of the to-be-processed block. For example, only the merge mode allows the combined prediction block to be used as the prediction block of the to-be-processed block. For another example, only a common merge mode allows the combined prediction block to be used as the prediction block of the to-be-processed block. The common merge mode herein does not include a candidate type including a plurality of groups of sub-block-level motion information such as ATMVP, Affine, or Fruc; but includes a candidate type including only one group of block-level motion information. Therefore, in the video encoding process or the video decoding process, the video coding apparatus determines, according to an agreed criterion, whether to use the combined prediction block or the first reference block as the prediction block of the to-be-processed block, with no need to introduce identification information.

Herein, the second preset criterion is agreed on in advance, and both the encoder side and the decoder side can learn of the second preset criterion. In this way, the video coding apparatus does not need to encode the flag, and can determine, by using the agreed second preset criterion, whether to use the combined prediction block as the prediction block of the to-be-processed block.

Optionally, in an embodiment, in a video decoding process, step 101 includes:

- parsing a bitstream to obtain fourth identification information;
- obtaining a predicted motion vector of the to-be-processed block from a candidate predicted motion vector set of the to-be-processed block according to the fourth identification information, where each predicted motion vector in the candidate predicted motion vector set corresponds to one reference frame index;
- wherein the predicted motion vector is the first motion vector; and
- wherein a reference frame index corresponding to the predicted motion vector is the first reference frame index.

Specifically, in the video decoding process, the video coding apparatus parses the bitstream to obtain the fourth identification information, and obtains the predicted motion vector of the to-be-processed block from the candidate predicted motion vector set of the to-be-processed block according to the fourth identification information. Herein, each predicted motion vector in the candidate predicted motion vector set of the to-be-processed block has a corresponding reference frame index. The fourth identification information herein may correspond to the first identification information in the foregoing video encoding process. In other words, content of the first identification information encoded in the foregoing video encoding process may be obtained in the video decoding process. For example, in the merge mode, the video coding apparatus may find the predicted motion vector of the to-be-processed block in the candidate predicted motion vector set according to only the fourth identification information, to obtain the first motion vector and the first reference frame index. Optionally, the fourth identification information may be identified by an index. Therefore, the video coding apparatus parses the bitstream, to obtain the fourth identification information, and further obtain the predicted motion vector. In this case, the first reference frame index and the first motion vector can be determined.

Optionally, in an embodiment, in a video decoding process, step 101 includes:

parsing a bitstream to obtain fifth identification information, the first reference frame index, and a vector difference;

obtaining a predicted motion vector of the to-be-processed block from a candidate predicted motion vector set of the to-be-processed block according to the fifth identification information; and adding the predicted motion vector and the vector difference to obtain the first motion vector.

Specifically, in the video decoding process, the video coding apparatus may parse the bitstream to obtain the fifth identification information, the first reference frame index, and the vector difference; and obtain the predicted motion vector of the to-be-processed block from the candidate predicted motion vector set of the to-be-processed block according to the fifth identification information. Then the video coding apparatus adds the predicted motion vector and the vector difference to obtain the first motion vector. The fifth identification information herein may correspond to the second identification information in the foregoing video encoding process. In other words, content of the second identification information encoded in the foregoing video encoding process may be obtained in the video decoding process. Optionally, the fifth identification information may be identified by a flag. For example, in a non-merge mode (for example, an AMVP mode), the video coding apparatus obtains the fifth identification information, the first reference frame index, and the vector difference through decoding; then obtains the predicted motion vector of the to-be-processed block according to the fifth identification information; and finally adds the predicted motion vector and the vector difference to obtain the first motion vector. Therefore, the video coding apparatus parses the bitstream to obtain the fifth identification information, the first reference frame index, and the vector difference, and further calculates the first motion vector, so that the first reference frame index and the first motion vector can be determined.

Optionally, in an embodiment, in a video decoding process, the combined prediction block is used as the prediction block of the to-be-processed block when sixth identification information is a third value, or the first reference block is used as the prediction block of the to-be-processed block when the sixth identification information is a fourth value. The third value is different from the fourth value. Before the scaling the first motion vector to obtain a second motion vector, the method further includes:

parsing the bitstream to obtain the sixth identification information, where the sixth identification information is the third value Specifically, in the video decoding process, the video coding apparatus may obtain the sixth identification information by parsing the bitstream. The sixth identification information herein may correspond to the third identification information in the foregoing video encoding process. In other words, content of the third identification information encoded in the foregoing video encoding process may be obtained in the video decoding process. The sixth identification information may be identified by a flag. Specifically, if a value of the sixth identification information is the third value, the video coding apparatus uses the combined prediction block as the prediction block of the to-be-processed block; if a value of the sixth identification information is a fourth value, the video coding apparatus uses the first reference block as the prediction block of the to-be-processed block. Herein, the third value may correspond to the first value in the video encoding process, and the fourth value may correspond to the second value in the video encoding process. For example, if the video coding apparatus obtains the third value after parsing out the sixth identification information, the video coding apparatus selects the combined prediction block as the prediction block of the to-be-processed block. Therefore, in this embodiment of this application, the video coding apparatus may parse the bitstream, to determine, according to a value of the sixth identification information obtained through parsing, whether to select the first reference block or the combined prediction block as the prediction block of the to-be-processed block.

It should be understood that the inter prediction method in this embodiment of this application may correspond to inter prediction shown in FIG. 1 and FIG. 2. The inter prediction method in this embodiment of this application may be performed in the inter prediction processes shown in FIG. 1 and FIG. 2. The inter prediction method in this embodiment of this application may be specifically performed by an inter prediction module in an encoder or a decoder. In addition, the inter prediction method in this embodiment of this application may be performed by any electronic device or apparatus that may need to encode and/or decode a video picture.

It should be further understood that numbers "first", "second", . . . , and the like introduced in this embodiment of this application are merely used for ease of description to distinguish between different objects, for example, different "reference frame indices", different "identification information", or different "motion vectors", and constitutes no limitation to this embodiment of this application.

The following describes the embodiments of this application by using the following embodiments. In the embodiments of this application, inter prediction allows each reference list to use two groups of motion information. This application provides Embodiment 1. Details are as follows:

Specifically, a new group of motion information of each reference list is obtained in the following manner:

$$RefX' = (RefX == 0)\ ?\ 1{:}0;\ \text{and}$$

$$MVX' = dX' * MVX/dX.$$

X represents 0 or 1 and represents a reference list 0 or a reference list 1, RefX represents a reference index of original motion information of a reference list X, and RefX' represents a reference index of a new group of motion information of the reference list X. RefX'=(RefX==0)? 1:0 represents that, if RefX is 0, and RefX' is 1; otherwise, RefX' is 0. dX represents a temporal distance between a current frame and a reference frame specified by RefX (that is, |POC (the current frame)–

POC (the reference frame specified by RefX)|), and dX' represents a temporal distance between the current frame and a reference frame specified by RefX' (that is, |POC (the current frame)−POC (the reference frame specified by RefX')|). MVX represents a motion vector of the original motion information of the reference list X, and MVX' represents a motion vector of the new group of motion information of the reference list X. MVX'=dX' *MVX/dX represents that the MV is scaled according to the temporal distance (POC distance) (which may be understood with reference to FIG. 4 and FIG. 5).

An original predictor is obtained according to PredUni=PredX, and $$PredBi = (Pred0 + Pred1) >> 1.$$

A predictor obtained after this embodiment of this application is obtained according to PredUni=(PredX+PredX') >>1, and $$PredUni = (PredX + PredX') >> 1, \text{ and}$$

$$PredBi = (Pred0 + Pred1) >> 1 + (Pred0' + Pred1') >> 1) >>> 1.$$

PredUni represents a predictor obtained through unidirectional prediction (compensation is performed by using only one group of motion information), PredBi represents a predictor obtained through bi-directional prediction (compensation is performed by using only two groups of motion information), PredX represents a predictor obtained by performing compensation by using the original motion information of the reference list X, and predX' represents a predictor obtained by performing compensation by using a new group of motion information of the reference list X (which may be understood with reference to FIG. 4 and FIG. 5).

For an AMVP mode, the original motion information is final motion information determined through motion estimation. For a merge mode, the original motion information is motion information of each candidate.

Whether each reference list uses two groups of motion information or one group of motion information is determined according to a sum of absolute transformed differences (SATD) criterion, and is identified by a flag.

A decoder side determines, according to the flag, whether each reference list uses two groups of motion information or one group of motion information for compensation, so as to ensure matching between an encoder side and the decoder side.

This application further provides Embodiment 2. Different from Embodiment 1, in Embodiment 2, only a merge mode allows each reference list to use two groups of motion information.

This application further provides Embodiment 3. Different from Embodiment 1 and Embodiment 2, in Embodiment 3, only a common merge mode allows each reference list to use two groups of motion information. The common merge mode herein does not include a candidate type including a plurality of groups of sub-block-level motion information such as ATMVP, Affine, or Fruc; but includes a candidate type including only one group of block-level motion information.

This application further provides Embodiment 4. Different from Embodiment 1, Embodiment 2, and Embodiment 3, in Embodiment 4, reference indices of new groups of motion information of all reference lists are obtained in different manners, and a reference index indicating a reference frame with a minimum QP in a current reference list except an original reference frame is selected.

This application further provides Embodiment 5. Different from Embodiment 1, Embodiment 2, Embodiment 3, and Embodiment 4, in Embodiment 5, reference indices of new groups of motion information of all reference lists are obtained in different manners, and a reference index indicating a reference frame with a shortest temporal distance from a current frame in a current reference list except an original reference frame is selected.

This application further provides Embodiment 6. Different from Embodiment 1, Embodiment 2, Embodiment 3, Embodiment 4, and Embodiment 5, in Embodiment 6, whether each reference list uses two groups of motion information or one group of motion information is determined according to a rate distortion optimization (Rate Distortion Optimization, RDO) criterion, and is identified by a flag.

This application further provides Embodiment 7. Different from Embodiment 1, Embodiment 2, Embodiment 3, Embodiment 4, Embodiment 5, and Embodiment 6, in Embodiment 7, whether each reference list uses two groups of motion information or one group of motion information is determined according to a sum of absolute differences (SAD) criterion, and is identified by a flag.

This application further provides Embodiment 8. Different from Embodiment 1, Embodiment 2, Embodiment 3, Embodiment 4, Embodiment 5, Embodiment 6, and Embodiment 7, in Embodiment 8, whether each reference list uses two groups of motion information or one group of motion information is determined according to a predetermined rule. For example, each reference list of a neighboring block uses two groups of motion information. In this solution, a flag does not need to be encoded, and an encoder side and a decoder side use the same predetermined rule.

This application further provides Embodiment 9. Different from Embodiment 1, Embodiment 2, Embodiment 3, Embodiment 4, Embodiment 5, Embodiment 6, Embodiment 7, and Embodiment 8, in Embodiment 9, the solution of the present disclosure is used only for configuration of a low-delay P, and is not used for random access configuration or configuration of a low-delay B.

In the technical solution in this embodiment of this application, for inter prediction, each reference list is allowed to use two groups of motion information. This solution reduces a bit rate in a case of same video quality. Configuration of the low-delay P brings a BD-bitrate gain of 2.6%, and increases encoding duration and decoding duration by 4% and 5% respectively.

The following describes the technical solutions in the embodiments of this application in other manners.

(1) In the inter prediction method in the embodiments of this application, each reference list is allowed to use two groups of motion information.

(2) Optionally, in the inter prediction method in the embodiments of this application, only the merge mode or the common merge mode allows each reference list to use two groups of motion information.

(3) Optionally, in the inter prediction method in the embodiments of this application, whether each reference list uses two groups of motion information or one group of motion information is determined according to the SATD criterion (or the RDO criterion, the SAD criterion, . . . ) or the predetermined rule.

(4) Optionally, in the inter prediction method in the embodiments of this application, a reference index of a new group of motion information of each reference list may be the reference index indicating the reference frame with a smallest QP in the current reference list except the original reference frame, the reference index indicating the reference frame with the shortest temporal distance from the current frame, or a reference index indicating a reference frame (RefX'=(RefX==0)? 1:0) determined according to a specific rule. The motion vector is obtained by scaling the original motion vector according to the temporal distance.

(5) Optionally, the inter prediction method in the embodiments of this application may be used only for configuration of the low-delay P.

The foregoing describes the inter prediction method according to the embodiments of this application. The following describes in detail an inter prediction apparatus according to an embodiment of this application with reference to FIG. 7. The inter prediction apparatus shown in FIG. 7 corresponds to the foregoing method (for example, the method shown in FIG. 3), and can perform the steps in the foregoing method. For brevity, repeated descriptions are appropriately omitted below.

Figure 7:
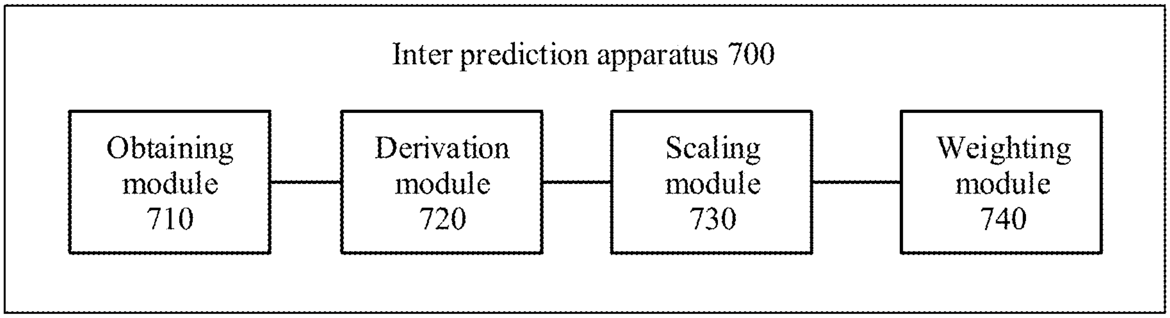
FIG. 7 is a schematic block diagram of an inter prediction apparatus according to an embodiment of this application.

FIG. 7 is a schematic block diagram of an inter prediction apparatus according to an embodiment of this application. The inter prediction apparatus 700 in FIG. 7 includes:

an obtaining module 710, configured to obtain a first reference frame index and a first motion vector of a to-be-processed block;

a derivation module 720, configured to derive a second reference frame index from the first reference frame index, where the second reference frame index is different from the first reference frame index;

a scaling module 730, configured to scale the first motion vector to obtain a second motion vector; where the obtaining module 710 is further configured to obtain a first reference block of the to-be-processed block according to the first reference frame index and the first motion vector; and the obtaining module 710 is further configured to obtain a second reference block of the to-be-processed block according to the second reference frame index and the second motion vector; and a weighting module 740, configured to weight the first reference block and the second reference block to obtain a combined prediction block.

Optionally, in an embodiment, the scaling module 730 is specifically configured to: multiply a ratio of a second distance to a first distance by the first motion vector, to obtain the second motion vector, where the first distance is a temporal distance between a picture frame in which the to-be-processed block is located and a picture frame indicated by the first reference frame index, and the second distance is a temporal distance between the picture frame in which the to-be-processed block is located and a picture frame indicated by the second reference frame index.

Optionally, in an embodiment, the derivation module 720 is specifically configured to:

when the first reference frame index is 0, the second reference frame index is 1; or when the first reference frame index is not 0, the second reference frame index is 0.

Optionally, in an embodiment, the derivation module 720 is specifically configured to:

determine that the picture frame indicated by the second reference frame index is a reference frame with a smallest quantization parameter in a reference frame set of the to-be-processed block except the picture frame indicated by the first reference frame index.

Optionally, in an embodiment, the derivation module 720 is specifically configured to:

determine that the picture frame indicated by the second reference frame index is a reference frame with a shortest temporal distance from the picture frame in which the to-be-processed block is located in a reference frame set of the to-be-processed block except the picture frame indicated by the first reference frame index.

Optionally, in an embodiment, the apparatus 700 is used for video encoding, and the apparatus 700 further includes:

an encoding module (not shown in the figure), configured to encode first identification information, where the first identification information is used to determine the first motion vector and the first reference frame index.

Optionally, in an embodiment, the apparatus 700 is used for video encoding, and the apparatus 700 further includes:

an encoding module (not shown in the figure), configured to encode second identification information, the first reference frame index, and a vector difference between the first motion vector and a predicted motion vector, where the second identification information is used to determine the predicted motion vector.

Optionally, in an embodiment, the apparatus 700 is used for video encoding. After the obtaining a combined prediction block, the apparatus 700 further includes:

a calculation module, configured to separately calculate, according to a first preset criterion, a first encoding cost value of using the combined prediction block as a prediction block of the to-be-processed block and a second encoding cost value of using the first reference block as the prediction block of the to-be-processed block, where the first preset criterion includes any one of the following criteria: a sum of absolute transformed differences SATD criterion, a rate distortion optimization RDO criterion, a sum of absolute differences SAD criterion, and a mean squared error MSE criterion; and a processing module, configured to: when the first encoding cost value is less than the second encoding cost value, use the combined prediction block as the prediction block of the to-be-processed block; or when the first encoding cost value is greater than or equal to the second encoding cost value, use the first reference block as the prediction block of the to-be-processed block.

Optionally, in an embodiment, the apparatus 700 is used for video encoding, and the apparatus 700 further includes:

an encoding module (not shown in the figure), configured to code third identification information, where the third identification information is a first value when the combined prediction block is used as the prediction block of the to-be-processed block, or the third identification information is a second value when the first reference block is used as the prediction block of the to-be-processed block. The first value is different from the second value.

Optionally, in an embodiment, before the scaling the first motion vector to obtain a second motion vector, the apparatus 700 further includes:

a determining module (not shown in the figure), further configured to determine that the to-be-processed block meets a second preset criterion, where the second preset criterion includes any one or a combination of several of the following criteria: a size of the to-be-processed block or a temporal or spatial neighboring block of the to-be-processed block meets a preset threshold, a block partition mode of the to-be-processed block or the temporal or spatial neighboring block of the to-be-processed block meets a preset block partition mode, or a prediction mode of the to-be-processed block or the temporal or spatial neighboring block of the to-be-processed block meets a preset prediction mode; and correspondingly, after the obtaining a combined prediction block, the apparatus 700 further includes:

a processing module (not shown in the figure), configured to use the combined prediction block as the prediction block of the to-be-processed block.

Optionally, in an embodiment, the apparatus 700 is used for video decoding, and the obtaining a first reference frame index and a first motion vector of a to-be-processed block includes: a parsing module (not shown in the figure), configured to parse a bitstream to obtain fourth identification information.

The obtaining module 710 is specifically configured to: obtain a predicted motion vector of the to-be-processed block from a candidate predicted motion vector set of the to-be-processed block according to the fourth identification information, where each predicted motion vector in the candidate predicted motion vector set corresponds to one reference frame index; use the predicted motion vector as the first motion vector; and use a reference frame index corresponding to the predicted motion vector as the first reference frame index.

Optionally, in an embodiment, the apparatus 700 is used for video decoding, and the obtaining module 710 is specifically configured to:

parse a bitstream to obtain fifth identification information, the first reference frame index, and a vector difference; and obtain a predicted motion vector of the to-be-processed block from a candidate predicted motion vector set of the to-be-processed block according to the fifth identification information, and add the predicted motion vector and the vector difference to obtain the first motion vector.

Optionally, in an embodiment, the apparatus 700 is used for video decoding. The combined prediction block is used as the prediction block of the to-be-processed block when sixth identification information is a third value, or the first reference block is used as the prediction block of the to-be-processed block when the sixth identification information is a fourth value. The third value is different from the fourth value. Before the scaling the first motion vector to obtain a second motion vector, the apparatus 700 further includes:

a parsing module, configured to parse the bitstream to obtain the sixth identification information, where the sixth identification information is the third value.

It should be understood that the apparatus 700 can perform the inter prediction method described above, and the foregoing and other management operations and/or functions of the modules in the apparatus 700 are separately used to implement corresponding steps of the foregoing methods. Therefore, beneficial effects in the foregoing method embodiments may also be implemented. For brevity, details are not described herein again. Optionally, the apparatus 700 may be specifically a video coding apparatus, a video coding system, or another device having a video coding function. The apparatus 700 can not only be configured to perform inter prediction in an encoding process, but also can be configured to perform inter prediction in a decoding process.

Optionally, the apparatus 700 may be a video coding apparatus or a device having a video coding function.

This application further provides a terminal device. The terminal device includes: a memory, configured to store a program; and a processor, configured to execute the program stored in the memory, where when the program is executed, the processor is configured to perform the inter prediction method in the embodiments of this application.

The terminal device herein may be a video display device, a smartphone, a portable computer, or another device that can process or play a video.

This application further provides a video encoder, including a non-volatile storage medium and a central processing unit. The non-volatile storage medium stores an executable program, and the central processing unit is connected to the non-volatile storage medium, and executes the executable program to implement the inter prediction method in the embodiments of this application.

This application further provides a video decoder, including a non-volatile storage medium and a central processing unit. The non-volatile storage medium stores an executable program, and the central processing unit is connected to the non-volatile storage medium, and executes the executable program to implement the inter prediction method in the embodiments of this application.

This application further provides a video encoding system, including a non-volatile storage medium and a central processing unit. The non-volatile storage medium stores an executable program, and the central processing unit is connected to the non-volatile storage medium, and executes the executable program to implement the inter prediction method in the embodiments of this application.

This application further provides a computer-readable medium. The computer-readable medium stores program code to be executed by a device, and the program code includes an instruction used to perform the inter prediction method in the embodiments of this application.

This application further provides a decoder, configured to perform the method in the video decoding process in the embodiments of this application. The decoder may include a corresponding module or unit, or may be implemented by using software and/or hardware.

This application further provides an encoder, configured to perform the method in the video encoding process in the embodiments of this application. The encoder may include a corresponding module or unit, or may be implemented by using software and/or hardware.

Figure 8:
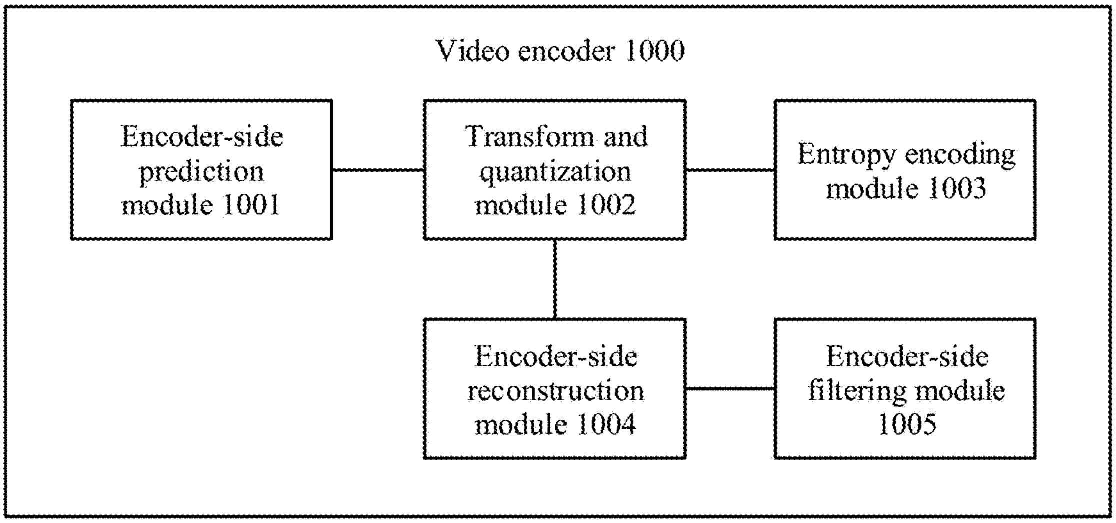
FIG. 8 is a schematic block diagram of a video encoder according to an embodiment of this application.
Figure 9:
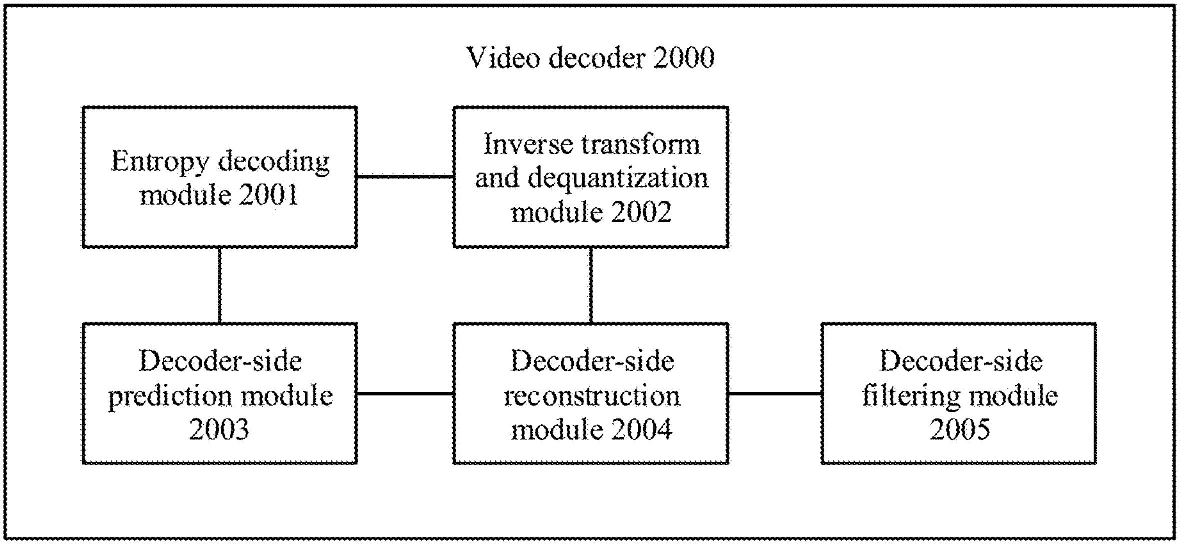
FIG. 9 is a schematic block diagram of a video decoder according to an embodiment of this application.

The following briefly describes, with reference to FIG. 8 and FIG. 9, structures of a video encoder and a video decoder that can perform the inter prediction method in the embodiments of this application.

FIG. 8 is a schematic block diagram of a video encoder according to an embodiment of this application. The video encoder 1000 shown in FIG. 8 includes an encoder-side prediction module 1001, a transform and quantization module 1002, an entropy encoding module 1003, an encoder-side reconstruction module 1004, and an encoder-side filtering module.

The video encoder 1000 shown in FIG. 8 may encode a video, and the video encoder 1000 can perform the video encoding process shown in FIG. 1, to encode the video.

The video encoder 1000 may further perform the inter prediction method in the embodiments of this application. Specifically, the video encoder 1000 may perform steps in the inter prediction method shown in FIG. 3.

The inter prediction apparatus in this embodiment of this application may be the encoder-side prediction module 1001 in the video encoder 1000. Specifically, the apparatus 700 is equivalent to the encoder-side prediction module 1001 in the video encoder 1000.

FIG. 9 is a schematic block diagram of a video decoder according to an embodiment of this application. The video decoder 2000 shown in FIG. 9 includes: an entropy decoding module 2001, an inverse transform and dequantization module 2002, a decoder-side prediction module 2003, a decoder-side reconstruction module 2004, and a decoder-side filtering module 2005.

The video decoder 2000 shown in FIG. 9 may decode a video, and the video decoder 2000 may perform a video decoding process shown in FIG. 2, to decode the video.

In addition, the video decoder 2000 may further perform the inter prediction method in the embodiments of this application. Specifically, the video decoder 2000 may perform steps in the inter prediction method shown in FIG. 3.

The inter prediction apparatus in this embodiment of this application may be the decoder-side prediction module 2003 in the video decoder 2000. Specifically, the apparatus 700 is equivalent to the decoder-side prediction module 2003 in the video decoder 2000.

Figure 10:
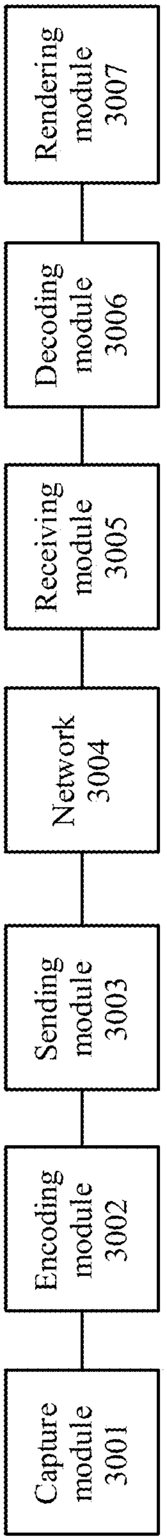
FIG. 10 is a schematic block diagram of a video transmission system according to an embodiment of this application.
Figure 11:
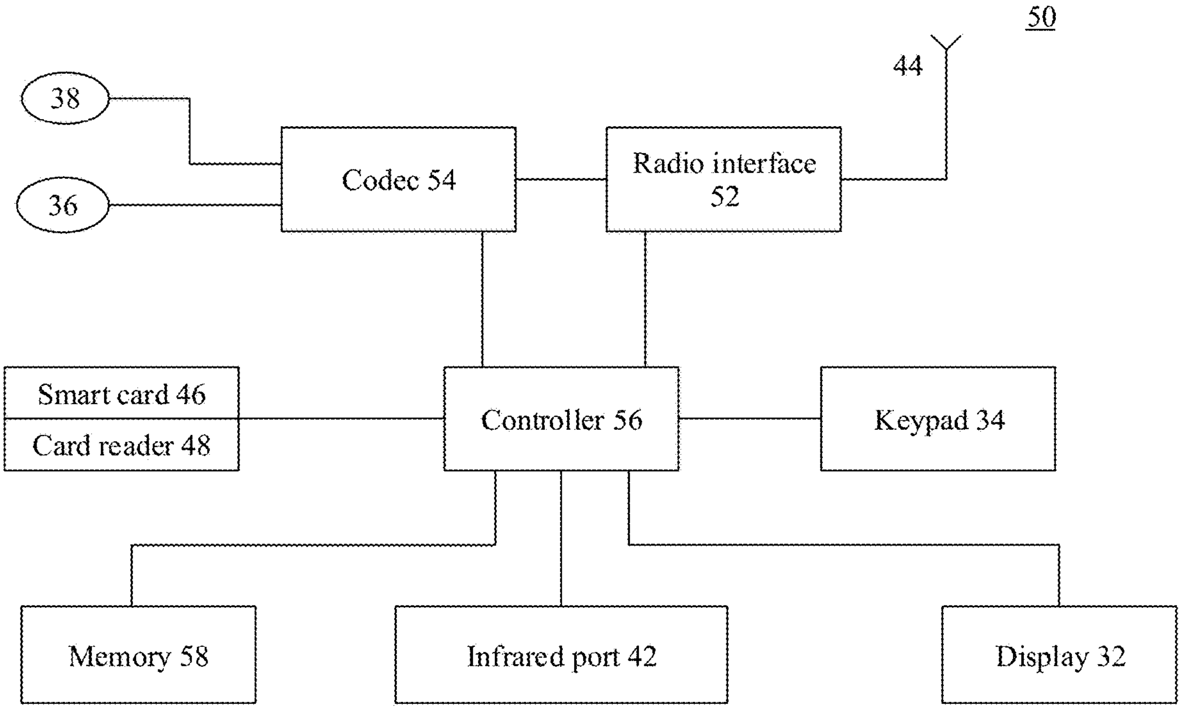
FIG. 11 is a schematic block diagram of a video coding apparatus according to an embodiment of this application.
Figure 12:
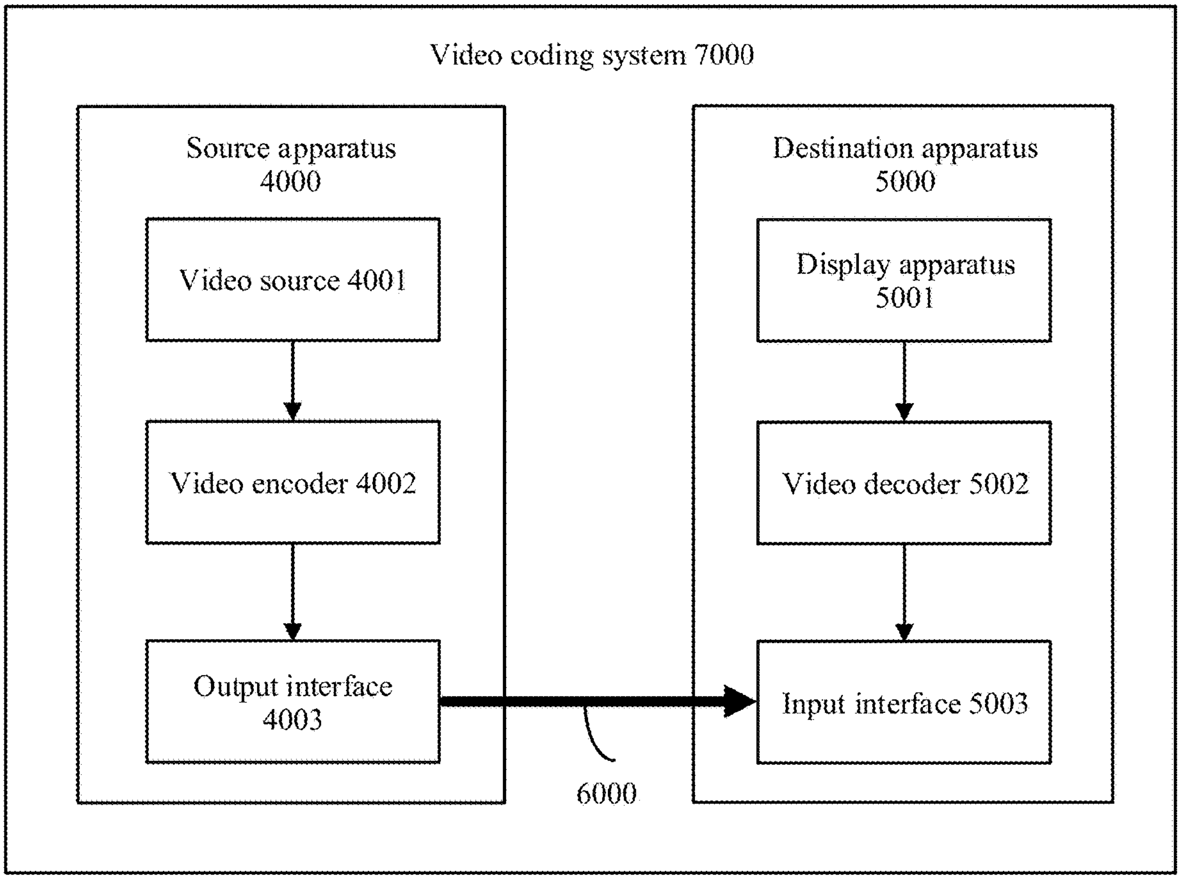
FIG. 12 is a schematic block diagram of a video coding system according to an embodiment of this application.

The following describes, with reference to FIG. 10 to FIG. 12, application scenarios of inter prediction methods according to embodiments of this application. The inter prediction methods in the embodiments of this application may be performed by a video transmission system, an encoding/decoding apparatus, and an encoding/decoding system that are shown in FIG. 10 to FIG. 12.

FIG. 10 is a schematic block diagram of the video transmission system according to an embodiment of this application.

As shown in FIG. 10, the video transmission system includes a capture module 3001, an encoding module 3002, a sending module 3003, a network transmission 3004, a receiving module 3005, a decoding module 3006, a rendering module 3007, and a display module 208.

The modules in the video transmission system have the following specific functions:

The capture module 3001 includes a camera or a camera assembly and is configured to capture a video picture and perform processing on the captured video picture before encoding, to convert an optical signal into a digitalized video sequence.

The encoding module 3002 is configured to encode the video sequence to obtain a bitstream.

The sending module 3003 is configured to send the encoded bitstream.

The receiving module 3005 is configured to receive the bitstream sent by the sending module 3003.

The network 3004 is configured to transmit, to the receiving module 3005, the bitstream sent by the sending module 3003.

The decoding module 3006 is configured to decode the bitstream received by the receiving module 3005 to reconstruct the video sequence.

The rendering module 3007 is configured to render a reconstructed video sequence obtained through decoding by the decoding module 3006, to improve a video display effect.

The video transmission system shown in FIG. 10 can perform the inter prediction method in the embodiments of this application. Specifically, the encoding module 3001 and the decoding module 3006 in the video transmission system shown in FIG. 10 can both perform the inter prediction method in the embodiments of this application.

In addition, the capture module 3001, the encoding module 3002, and the sending module 3003 in the video transmission system shown in FIG. 10 are equivalent to the video encoder 1000 shown in FIG. 8. The receiving module 3005, the decoding module 3006, and the rendering module 3007 in the video transmission system shown in FIG. 10 are equivalent to the video decoder 2000 shown in FIG. 9.

The following describes in detail an encoding/decoding apparatus and an encoding/decoding system including the encoding/decoding system with reference to FIG. 11 and FIG. 12. It should be understood that the encoding/decoding apparatus and the encoding/decoding system shown in FIG. 11 and FIG. 12 can perform the inter prediction method in the embodiments of this application.

FIG. 11 is a schematic diagram of a video coding apparatus according to an embodiment of this application. The video coding apparatus 50 may be an apparatus dedicated for encoding and/or decoding a video picture, or an electronic device having a video coding function. Further, the encoding/decoding apparatus 50 may be a mobile terminal or user equipment in a wireless communications system.

The encoding/decoding apparatus 50 may include the following modules or units: a controller 56, a codec 54, a radio interface 52, an antenna 44, a smart card 46, a card reader 48, a keypad 34, a memory 58, an infrared port 42, and a display 32. In addition to the modules and the units shown in FIG. 11, the encoding/decoding apparatus 50 may further include a microphone and any proper audio input module. The audio input module may input a digital signal or an analog signal. The encoding/decoding apparatus 50 may further include an audio output module. The audio output module may be an earphone, a speaker, or an analog audio output connector or a digital audio output connector. The encoding/decoding apparatus 50 may further include a battery. The battery may be a solar cell, a fuel cell, or the like. The encoding/decoding apparatus 50 may further include an infrared port configured to perform short-range line-of-sight communication with another device. The encoding/decoding apparatus 50 may further communicate with the another device in any proper short-range communication mode, for example, a Bluetooth wireless connection or a USB/live line wired connection.

The memory 58 may store data in a form of a picture and data in a form of audio, and may also store an instruction to be executed on the controller 56.

The codec 54 may encode and decode the audio and/or video data; or implement, under the control of the controller 56, assisted encoding and assisted decoding on the audio and/or video data.

The smart card 46 and the card reader 48 may provide user information, and may also provide authentication information of network authentication and an authorized user. Specific implementation forms of the smart card 46 and the card reader 48 may be a universal integrated circuit card (Universal Integrated Circuit Card, UICC) and a UICC reader.

The radio interface circuit 52 may generate a wireless communications signal. The wireless communications signal may be a communications signal generated during communication in a cellular communications network, a wireless communications system, or a wireless local area network.

The antenna 44 is configured to send, to another apparatus (there may be at least one apparatus), a radio frequency signal generated on the radio interface circuit 52, and may be further configured to receive a radio frequency signal from another apparatus (there may be at least one apparatus).

In some embodiments of this application, the encoding/decoding apparatus 50 may receive to-be-processed video picture data from another device before transmission and/or storage. In other embodiments of this application, the encoding/decoding apparatus 50 may receive a picture through a wireless or wired connection and encode/decode the received picture.

FIG. 12 is a schematic block diagram of a video coding system 7000 according to an embodiment of this application.

As shown in FIG. 12, the video coding system 7000 includes a source apparatus 4000 and a destination apparatus 5000. The source apparatus 4000 generates encoded video data. The source apparatus 4000 may also be referred to as a video encoding apparatus or a video encoding device. The destination apparatus 5000 may decode the encoded video data generated by the source apparatus 4000. The destination apparatus 5000 may also be referred to as a video decoding apparatus or a video decoding device.

Specific implementation forms of the source apparatus 4000 and the destination apparatus 5000 may be any one of the following devices: a desktop computer, a mobile computing apparatus, a notebook (for example, laptop) computer, a tablet computer, a set top box, a smartphone, a handset, a television, a camera, a display apparatus, a digital media player, a video game console, an in-vehicle computer, or another similar device.

The destination apparatus 5000 may receive the encoded video data from the source apparatus 4000 through a channel 6000. The channel 6000 may include at least one medium and/or apparatus that can move the encoded video data from the source apparatus 4000 to the destination apparatus 5000. In an example, the channel 6000 may include at least one communications medium that can enable the source apparatus 4000 to directly transmit the encoded video data to the destination apparatus 5000 in real time. In this example, the source apparatus 4000 may modulate the encoded video data according to a communications standard (for example, a wireless communications protocol) and may transmit the modulated video data to the destination apparatus 5000. The at least one communications medium may include wireless and/or wired communications media, for example, a radio frequency (Radio Frequency, RF) spectrum or at least one physical transmission line. The at least one communications medium may form a part of a packet-based network (for example, a local area network, a wide area network, or a global network (for example, the internet)). The at least one communications medium may include a router, a switch, a base station, or another device implementing communication from the source apparatus 4000 to the destination apparatus 5000.

In another example, the channel 6000 may include a storage medium that stores the encoded video data generated by the source apparatus 4000. In this example, the destination apparatus 5000 may access the storage medium through disk access or card access. The storage medium may include a plurality of types of local access-type data storage media such as a Blu-ray disc, a high-density digital video disc (DVD), a read-only disc (CD-ROM), or a flash memory, or another proper digital storage medium configured to store the encoded video data.

In another example, the channel 6000 may include a file server or another intermediate storage apparatus that stores the encoded video data generated by the source apparatus 4000. In this example, the destination apparatus 5000 may access, through streaming transmission or downloading, the encoded video data stored in the file server or the another intermediate storage apparatus. The file server may be of a server type that can store the encoded video data and transmit the encoded video data to the destination apparatus 5000. For example, the file server may include a world wide web (Web) server (for example, used for a website), a file transfer protocol (FTP) server, a network attached storage (NAS) apparatus, and a local disk drive.

The destination apparatus 5000 may access the encoded video data through a standard data connection (for example, an internet connection). An example type of the data connection includes a radio channel, a wired connection (for example, a cable modem), or a combination thereof that is suitable for accessing the encoded video data stored in the file server. The encoded video data may be transmitted from the file server through streaming transmission, downloading transmission, or a combination thereof.

The inter prediction method in this application is not limited to a wireless application scenario. For example, the inter prediction method in this application may be applied to video coding supporting a plurality of multimedia applications such as the following applications: over-the-air television broadcasting, cable television transmission, satellite television transmission, streaming video transmission (for example, over the internet), encoding of video data stored in a data storage medium, decoding of video data stored in a data storage medium, or another application. In some examples, the video coding system 7000 may be configured to support uni-directional or bi-directional video transmission, so as to support applications such as video streaming transmission, video playing, video broadcasting, and/or videotelephony.

In FIG. 12, the source apparatus 4000 includes a video source 4001, a video encoder 4002, and an output interface 4003. In some examples, the output interface 4003 may include a modulator/demodulator (modem) and/or a transmitter. The video source 4001 may include a video capture apparatus (for example, a video camera), a video archive including previously captured video data, a video input interface configured to receive video data from a video content provider, and/or a computer graphics system configured to generate video data, or a combination of the foregoing video data sources.

The video encoder 4002 may encode video data from the video source 4001. In some examples, the source apparatus 4000 directly transmits encoded video data to the destination apparatus 5000 through the output interface 4003. The encoded video data may be further stored in a storage medium or a file server, so that the destination apparatus 5000 accesses the encoded video data later for decoding and/or playing.

In the example in FIG. 12, the destination apparatus 5000 includes an input interface 5003, a video decoder 5002, and a display apparatus 5001. In some examples, the input interface 5003 includes a receiver and/or a modem. The input interface 5003 may receive encoded video data through the channel 6000. The display apparatus 5001 may be integrated with the destination apparatus 5000 or may be outside the destination apparatus 5000. The display apparatus 5001 usually displays decoded video data. The display apparatus 5001 may include a plurality of types of display apparatuses such as a liquid crystal display, a plasma display, an organic light-emitting diode display, or a display apparatus of another type.

The video encoder 4002 and the video decoder 5002 may operate according to a video compression standard (for example, a high efficiency video coding H.265 standard), and may comply with a high efficiency video coding (HEVC) test model (HM). Text description ITU-TH.265 (V3) (04/2015) of the H.265 standard is released on Apr. 29, 2015, and may be downloaded from http://handle.itu.int/11.1002/7000/12455. All content of the file is incorporated in this specification by reference in its entirety.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this application usually indicates an "or" relationship between the associated objects.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or at least two units are integrated into one unit.

When the functions are implemented in the form of a software functional unit and sold or used as an independent product, the functions may be stored in a computer-readable storage medium. According to such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An inter prediction method performed by a coding device, comprising:

obtaining a first reference frame index and a first motion vector of a to-be-processed block;

obtaining a second reference frame index, wherein a picture frame indicated by the second reference frame index is a reference frame in a reference frame set of the to-be-processed block except a picture frame indicated by the first reference frame index;

obtaining a second motion vector based on a result of multiplying a ratio of a second distance to a first distance by the first motion vector, wherein the first distance is a temporal distance between a picture frame in which the to-be-processed block is located and a picture frame indicated by the first reference frame index, and the second distance is a temporal distance between the picture frame in which the to-be-processed block is located and a picture frame indicated by the second reference frame index;

obtaining a first reference block of the to-be-processed block according to the first reference frame index and the first motion vector;

obtaining a second reference block of the to-be-processed block according to the second reference frame index and the second motion vector; and weighing the first reference block and the second reference block to obtain a combined prediction block.

2. The method according to claim 1, further comprising:

when the first reference frame index is 0, the second reference frame index is derived as 1, or when the first reference frame index is not 0, the second reference frame index is derived as 0.

3. The method according to claim 1, further comprising:

encoding first identification information, wherein the first identification information is used to determine the first motion vector and the first reference frame index.

4. The method according to claim 1, wherein the coding device is a decoder, and the obtaining the first reference frame index and the first motion vector of the to-be-processed block comprises:

parsing a bitstream to obtain a fourth identification information;

obtaining a predicted motion vector of the to-be-processed block from a candidate predicted motion vector set of the to-be-processed block according to the fourth identification information, wherein each predicted motion vector in the candidate predicted motion vector set corresponds to one reference frame index, wherein the predicted motion vector is the first motion vector, and wherein a reference frame index corresponding to the predicted motion vector is the first reference frame index.

5. The method according to claim 1, wherein the coding device is a decoder, and the obtaining the first reference frame index and the first motion vector of the to-be-processed block comprises:

parsing a bitstream to obtain a fifth identification information, the first reference frame index, and a vector difference;

obtaining a predicted motion vector of the to-be-processed block from a candidate predicted motion vector set of the to-be-processed block according to the fifth identification information; and adding the predicted motion vector and the vector difference to obtain the first motion vector.

6. The method according to claim 1, wherein the coding device is a decoder, and the combined prediction block is used as a prediction block of the to-be-processed block when sixth identification information is a third value, or the first reference block is used as a prediction block of the to-be-processed block when the sixth identification information is a fourth value, wherein the third value is different from the fourth value, and wherein before the obtaining the second motion vector based on the result of multiplying the ratio of the second distance to the first distance by the first motion vector, the method further comprises:

parsing the bitstream to obtain the sixth identification information, wherein the sixth identification information is the third value.

7. The method according to claim 1, wherein before the obtaining the second motion vector based on the result of multiplying the ratio of the second distance to the first distance by the first motion vector, the method further comprises:

determining that the to-be-processed block meets a second preset criterion, wherein the second preset criterion comprises any one or a combination of several of following criteria: a size of the to-be-processed block or a temporal or spatial neighboring block of the to-be-processed block meets a preset threshold, a block partition mode of the to-be-processed block or the temporal or spatial neighboring block of the to-be-processed block meets a preset block partition mode, or a prediction mode of the to-be-processed block or the temporal or spatial neighboring block of the to-be-processed block meets a preset prediction mode, and wherein after the combined prediction block is obtained, the method further comprises:

using the combined prediction block as a prediction block of the to-be-processed block.

8. A terminal apparatus, comprising:

a memory, configured to store instructions; and one or more processors coupled to the memory and upon execution of the instructions, configured to:

obtain a first reference frame index and a first motion vector of a to-be-processed block;

obtain a second reference frame index, wherein a picture frame indicated by the second reference frame index is a reference frame in a reference frame set of the to-be-processed block except a picture frame indicated by the first reference frame index;

obtain a second motion vector based on a result of multiplying a ratio of a second distance to a first distance by the first motion vector, wherein the first distance is a temporal distance between a picture frame in which the to-be-processed block is located and a picture frame indicated by the first reference frame index, and the second distance is a temporal distance between the picture frame in which the to-be-processed block is located and a picture frame indicated by the second reference frame index;

obtain a first reference block of the to-be-processed block according to the first reference frame index and the first motion vector;

obtain a second reference block of the to-be-processed block according to the second reference frame index and the second motion vector; and weigh the first reference block and the second reference block to obtain a combined prediction block.

9. The terminal apparatus according to claim 8, wherein when the first reference frame index is 0, the second reference frame index is derived as 1, or when the first reference frame index is not 0, the second reference frame index is derived as 0.

10. The terminal apparatus according to claim 8, wherein the one or more processors are further configured to:

encode first identification information, wherein the first identification information is used to determine the first motion vector and the first reference frame index.

11. The terminal apparatus according to claim 8, wherein the one or more processors are further configured to:

parse a bitstream to obtain fourth identification information;

obtain a predicted motion vector of the to-be-processed block from a candidate predicted motion vector set of the to-be-processed block according to the fourth identification information, wherein each predicted motion vector in the candidate predicted motion vector set corresponds to one reference frame index;

use the predicted motion vector as the first motion vector; and use a reference frame index corresponding to the predicted motion vector as the first reference frame index.

12. The terminal apparatus according to claim 8, wherein the one or more processors are further configured to:

parse a bitstream to obtain a fifth identification information, the first reference frame index, and a vector difference;

obtain a predicted motion vector of the to-be-processed block from a candidate predicted motion vector set of the to-be-processed block according to the fifth identification information; and add the predicted motion vector and the vector difference to obtain the first motion vector.

13. The terminal apparatus according to claim 8, wherein the one or more processors are further configured to:

parse the bitstream to obtain sixth identification information, wherein the sixth identification information is a third value.

14. The terminal apparatus according to claim 8, wherein before the one or more processors are configured to obtain the second motion vector based on the result of multiplying the ratio of the second distance to the first distance by the first motion vector, the one or more processors are further configured to:

determine that the to-be-processed block meets a second preset criterion, wherein the second preset criterion comprises any one or a combination of several of following criteria: a size of the to-be-processed block or a temporal or spatial neighboring block of the to-be-processed block meets a preset threshold, a block partition mode of the to-be-processed block or the temporal or spatial neighboring block of the to-be-processed block meets a preset block partition mode, or a prediction mode of the to-be-processed block or the temporal or spatial neighboring block of the to-be-processed block meets a preset prediction mode, and wherein after the combined prediction block is obtained, the one or more processors are further configured to use the combined prediction block as a prediction block of the to-be-processed block.

15. A non-transitory computer-readable storage medium storing a video bitstream that is generated by a method performed by a coding device, the method comprising:

obtaining a first reference frame index and a first motion vector of a to-be-processed block;

obtaining a second reference frame index, and a picture frame indicated by the second reference frame index is a reference frame in a reference frame set of the to-be-processed block except a picture frame indicated by the first reference frame index;

obtaining a second motion vector based on a result of multiplying a ratio of a second distance to a first distance by the first motion vector, wherein the first distance is a temporal distance between a picture frame in which the to-be-processed block is located and a picture frame indicated by the first reference frame index, and the second distance is a temporal distance between the picture frame in which the to-be-processed block is located and a picture frame indicated by the second reference frame index;

obtaining a first reference block of the to-be-processed block according to the first reference frame index and the first motion vector;

obtaining a second reference block of the to-be-processed block according to the second reference frame index and the second motion vector; and weighing the first reference block and the second reference block to obtain a combined prediction block.

16. The non-transitory computer-readable storage medium according to claim 15, wherein the method further comprises:

when the first reference frame index is 0, the second reference frame index is derived as 1, or when the first reference frame index is not 0, the second reference frame index is derived as 0.

17. The non-transitory computer-readable storage medium according to claim 15, wherein the video bitstream comprises first identification information, and wherein the first identification information is used to determine the first motion vector and the first reference frame index.

18. The non-transitory computer-readable storage medium according to claim 15, wherein before the obtaining the second motion vector based on the result of multiplying the ratio of the second distance to the first distance by the first motion vector, the method further comprises:

determining that the to-be-processed block meets a second preset criterion, wherein the second preset criterion comprises any one or a combination of several of following criteria: a size of the to-be-processed block or a temporal or spatial neighboring block of the to-be-processed block meets a preset threshold, a block partition mode of the to-be-processed block or the temporal or spatial neighboring block of the to-be-processed block meets a preset block partition mode, or a prediction mode of the to-be-processed block or the temporal or spatial neighboring block of the to-be-processed block meets a preset prediction mode, and wherein after the combined prediction block is obtained, the method further comprises:

using the combined prediction block as a prediction block of the to-be-processed block.

* * * * *